(12) United States Patent
Yoshizawa et al.

(10) Patent No.: US 7,160,372 B2
(45) Date of Patent: Jan. 9, 2007

(54) INK JET INK, INK JET RECORDING METHOD, INK CARTRIDGE, RECORDING UNIT, AND INK JET RECORDING APPARATUS

(75) Inventors: Jun Yoshizawa, Tokyo (JP); Shin-ichi Sato, Kawasaki (JP); Kunihiko Nakamura, Gotenba (JP); Daiji Okamura, Yokohama (JP); Tomohiro Yamashita, Kawasaki (JP); Masanori Jinnou, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/322,116

(22) Filed: Dec. 30, 2005

(65) Prior Publication Data

US 2006/0102047 A1 May 18, 2006

Related U.S. Application Data

(63) Continuation of application No. PCT/JP05/12702, filed on Jul. 4, 2005.

(30) Foreign Application Priority Data

Jul. 2, 2004 (JP) .............................. 2004-196453
Jun. 30, 2005 (JP) .............................. 2005-192191

(51) Int. Cl.
*C09D 11/02* (2006.01)
*B41J 2/01* (2006.01)

(52) U.S. Cl. ................................ 106/31.47; 106/31.77; 347/100

(58) Field of Classification Search ............. 106/31.47, 106/31.49, 31.77, 31.78; 347/100
See application file for complete search history.

(56) References Cited

U.S. PATENT DOCUMENTS

| 4,202,870 | A | 5/1980 | Weber et al. ................ 423/630 |
| 4,242,271 | A | 12/1980 | Weber et al. ................ 260/448 |
| 4,391,960 | A | 7/1983 | Kleine et al. ................. 526/74 |
| 4,723,129 | A | 2/1988 | Endo et al. ................... 346/1.1 |
| 4,740,796 | A | 4/1988 | Endo et al. ................... 346/1.1 |
| 5,091,009 | A | 2/1992 | Nogami et al. ........... 106/287.1 |
| 5,123,960 | A * | 6/1992 | Shirota et al. ........... 106/31.46 |
| 5,221,497 | A | 6/1993 | Watanabe et al. ......... 252/313.2 |
| 5,882,360 | A | 3/1999 | Bauer et al. .................... 8/661 |
| 5,922,116 | A * | 7/1999 | Mistry et al. ............. 106/31.47 |
| 6,190,422 | B1 * | 2/2001 | Carr ............................... 8/445 |
| 6,342,096 | B1 * | 1/2002 | Kurabayashi ............ 106/31.27 |
| 6,379,441 | B1 * | 4/2002 | Kanaya et al. ........... 106/31.49 |
| 6,569,212 | B1 * | 5/2003 | Carr ............................... 8/445 |
| 2004/0045478 | A1 | 3/2004 | Tateishi et al. .......... 106/31.49 |
| 2005/0174410 | A1* | 8/2005 | Hasemann et al. ......... 347/100 |
| 2006/0102046 | A1* | 5/2006 | Okamura et al. ........ 106/31.47 |
| 2006/0119682 | A1* | 6/2006 | Okamura et al ......... 106/31.47 |
| 2006/0119683 | A1* | 6/2006 | Yoshizawa et al. ......... 347/100 |
| 2006/0137570 | A1* | 6/2006 | Osumi et al. ............. 106/31.27 |
| 2006/0152569 | A1* | 7/2006 | Jinnou et al. ............... 347/105 |

FOREIGN PATENT DOCUMENTS

| DE | 4119591 | 12/1992 |
| JP | H57-44605 | 3/1982 |
| JP | 57-198758 | 12/1982 |
| JP | 61-087759 | 5/1986 |
| JP | H5-171085 | 7/1993 |
| JP | H10-130517 | 5/1998 |
| JP | 2803134 | 7/1998 |
| JP | 2881847 | 2/1999 |
| JP | H11-29729 | 2/1999 |
| JP | 2942319 | 6/1999 |
| JP | 2000-303009 | 10/2000 |
| JP | 2002-249677 | 9/2002 |
| JP | 2004/315758 A | 11/2004 |
| JP | 2004/315807 A | 11/2004 |
| JP | 2004/323605 A | 11/2004 |
| WO | WO 2004/087815 | 10/2004 |

OTHER PUBLICATIONS

English translation of JP 2004/323605, Nov. 2004.*

\* cited by examiner

*Primary Examiner*—Helene Klemanski
(74) *Attorney, Agent, or Firm*—Fitzpatrick, Cella, Harper & Scinto

(57) ABSTRACT

There is provided ink jet ink containing at least a coloring material, in which: the coloring material is a compound represented by the following general formula (I) or a salt thereof; a content (weight %) of the coloring material is 3.0 weight % or more with respect to a total weight of the ink jet ink; in a dispersion distance distribution, measured by a small-angle X-ray scattering method, of molecular aggregates in the ink jet ink whose coloring material concentration is adjusted to 3.0 weight %, a dispersion distance $d_{75}$ value corresponding to 75% of the distribution is 6.50 nm or more and 7.10 nm or less:

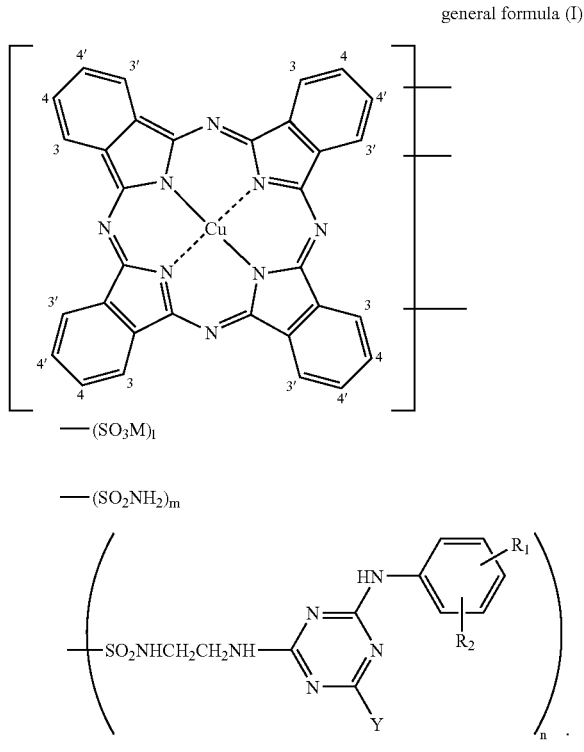

general formula (I)

18 Claims, 9 Drawing Sheets

INK JET INK, INK JET RECORDING METHOD, INK CARTRIDGE, RECORDING UNIT, AND INK JET RECORDING APPARATUS

This application is a continuation of International Application No. PCT/JP2005/012702 filed on Jul. 4, 2005, which claims the benefit of Japanese Patent Application No. 2004-196453 filed on Jul. 2, 2004 and Japanese Patent Application No. 2005-192191 filed on Jun. 30, 2005.

BACKGROUND OF THE INVENTION

1. Field of the Invention

The present invention relates to an ink jet ink which has high environmental gas resistance and provides a good image which suppresses the occurrence of metallic luster, so-called a bronze phenomenon even when the ink is printed on a recording medium. The present invention also relates to an ink jet recording method, an ink cartridge, a recording unit, and an ink jet recording apparatus each using the ink jet ink.

2. Related Background Art

An ink jet recording method is a recording method involving applying a small ink droplet to any one of recording media such as plain paper and glossy media to form an image, and had become rapidly widespread owing to a reduction in its cost and an improvement in its recording rate. With the rapid spread of a digital camera in addition to an improvement in quality of an image recorded by the method, the method has been generally used as a method of outputting a photographic image comparable to silver halide photograph.

In recent years, image quality has undergone an improvement never possible before owing to, for example, an extreme reduction in size of an ink droplet and an improvement of color gamut involved in the introduction of multicolor ink. Meanwhile, there have been growing demands for a coloring material and inks, so more stringent properties have been required in terms of an improvement of color developability and reliability such as anti-clogging or ejection stability.

As compared to silver halide photograph, the ink jet recording method is problematic in terms of, for example, the image storage stability of the resultant recorded product. In general, the recorded product obtained by means of the ink jet recording method is inferior in image storage stability to silver halide photograph, and involves the emergence of a problem in that a coloring material on the recorded product is apt to deteriorate to cause a change in color tone of an image and the color fading of the image when the recorded product is exposed to light, heat, environmental gases present in the air, or the like for a long period of time. In particular, an improvement of environmental gas resistance to the level of silver halide photograph has been. conventionally of a concern in the ink jet recording method. Cyan has the lowest environmental gas resistance out of yellow, magenta, and cyan, which are hues used for ink jet ink. Therefore, an improvement of the environmental gas resistance of cyan ink to the level comparable to that of yellow ink or magenta ink is of one important concern in the ink jet recording method.

The basic skeletons of coloring materials for ink jet ink having a cyan hue are roughly classified into a phthalocyanine skeleton and a triphenylmethane skeleton. Representative coloring materials of the former include C.I. Direct Blue 86 and 87, and C.I. Direct Blue 199. Representative coloring materials of the latter include C.I. Acid Blue 9.

In general, a phthalocyanine-based coloring material is characterized in that it is excellent in light resistance as compared to a triphenylmethane-based coloring material. Furthermore, the phthalocyanine-based coloring material has high fastness properties against humidity or heat and has good color developability, and so the coloring material has been vigorously used as a coloring material for ink jet ink.

However, the phthalocyanine-based coloring material tends to be poor in fastness against environmental gases in the air (such as ozone, $No_x$, or $SO_2$), especially an ozone gas. In particular, in a recorded product obtained by applying the coloring material on a recording medium having an ink-receiving layer containing an inorganic substance such as alumina or silica, the fastness is remarkably low, so the color fading of the recorded product is remarkable when the recorded product is left standing in a room for a long period of time. Various compounds to be added to ink have been disclosed for the purpose of improving the environmental gas resistance (see, for example, Japanese Patent Application Laid-Open No. H05-171085, Japanese Patent Application Laid-Open No. H11-29729, Japanese Patent Application Laid-Open No. H10-130517, Japanese Patent Application Laid-Open No. 2000-303009, and Japanese Patent Application Laid-Open No. 2002-249677). However, none of those publications has achieved compatibility between good color developability and high environmental gas resistance for ink jet ink.

The phthalocyanine-based coloring material involves another problem, that is, the occurrence of metallic luster resulting from the high aggregation properties of the coloring material, so-called a bronze phenomenon. When a bronze phenomenon occurs in a recorded product, the optical reflectance property of the recorded product changes. As a result, the color developability and hue of an image remarkably change, with the result that a remarkable reduction in image quality occurs. The bronze phenomenon is expected to occur as a result of the aggregation of a coloring material on the surface of a recording medium due to, for example, the high aggregation properties of the coloring material in ink and a reduction in permeability of the ink into the recording medium when the ink is applied to the recording medium. In particular, a coloring material having introduced in a molecule thereof an amino group for the purpose of improving environmental gas resistance, or ink containing a coloring material having low solubility in water tends to cause a remarkable bronze phenomenon.

For example, there has been proposed that a specific phthalocyanine-based coloring material is used to improve environmental gas resistance (see, for example, Japanese Patent No. 2942319). The use of the specific phthalocyanine-based coloring material provides environmental gas resistance which is of one concern in the phthalocyanine-based coloring material. However, the proposal does not refer to the bronze phenomenon, so the bronze resistance of the coloring material is unclear. In other words, compatibility between bronze resistance and environmental gas resistance has not yet been achieved.

Therefore, a search for ink jet ink using a phthalocyanine-based coloring material which is excellent in color developability, has high environmental gas resistance, and suppresses the occurrence of a bronze phenomenon has been indispensable.

SUMMARY OF THE INVENTION

In view of the above problems, the inventors of the present invention have made extensive studies. As a result, the inventors have found that ink jet ink which is excellent in color developability, has high environmental gas resistance, and is capable of providing an image excellent in bronze resistance can be provided by using a specific phthalocyanine-based coloring material and controlling the aggregation properties of the coloring material, thereby completing the present invention.

Therefore, an object of the present invention is to provide an ink jet ink which is excellent in color developability, has high environmental gas resistance, and is capable of providing an image excellent in bronze resistance.

Another object of the present invention is to provide a recording method, a recording unit, an ink cartridge, and an ink jet recording apparatus each using the ink jet ink.

The above objects are achieved by the present invention described below. That is, according to one aspect of the present invention, there is provided an ink jet ink containing at least a coloring material, in which: the coloring material is a compound represented by the following general formula (I) or a salt thereof; and a content (weight %) of the coloring material is 3.0 weight % or more with respect to a total weight of the ink jet ink; and in a dispersion distance distribution, measured by a small-angle X-ray scattering method, of molecular aggregates in the ink jet ink whose coloring material concentration is adjusted to 3.0 weight %, a dispersion distance $d_{75}$ value corresponding to 75% of the distribution is 3.0 mass % is 6.50.nm or more and 7.10 nm or less:

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and the substitution position of a substituent is 4 position or 4' position.

According to another aspect of the present invention, there is provided an ink jet ink containing at least a coloring material, in which: the coloring material is a compound represented by the following general formula (I) or a salt thereof; a content (weight %) of: the coloring material is 3.0 weight % or more with respect to a total weight of the ink jet ink; and a maximum absorption wavelength (λmax) obtained by measuring an absorbance of an ink prepared by diluting 2,000 times the ink jet ink is 612.0 nm or more and 616.0 nm or less:

general formula (I)

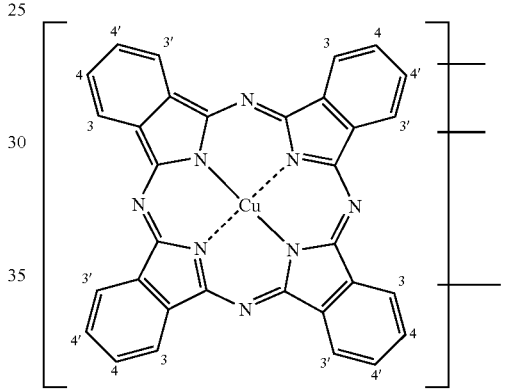

general formula (I)

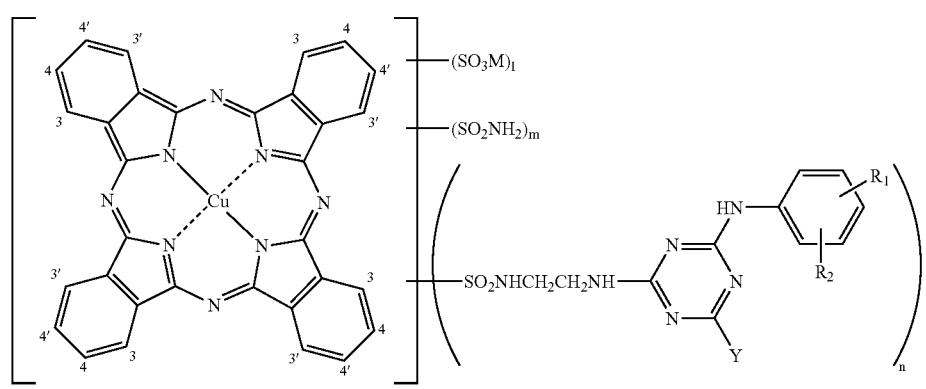

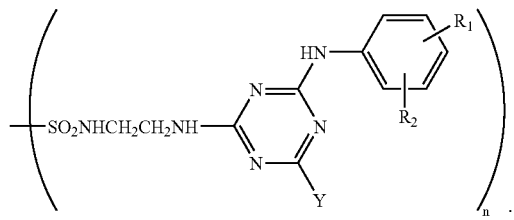

wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and the substitution position of a substituent is 4 position or 4' position.

In further aspect of the ink jet ink, the coloring material is a compound represented by the following general formula (II) or a salt thereof:

general formula (II)

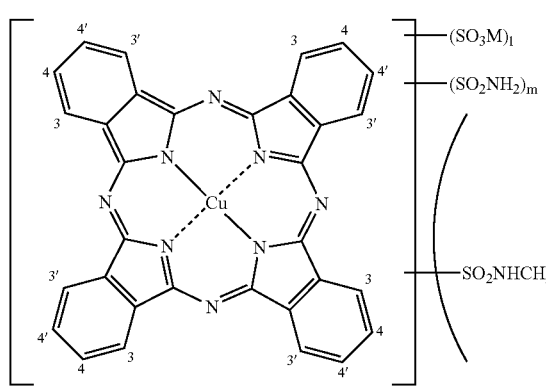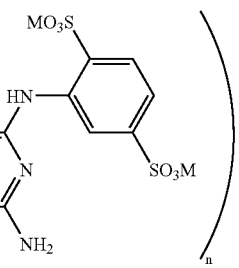

wherein M represents an alkali metal or ammonium; l represents 0 to 2, m represents 1 to 3, and n represents 1 to 3 (provided that l+m+n=3 to 4); and the substitution position of a substituent is 4position or 4' position.

In further aspect of the ink jet ink, the ink jet ink further contains water and a water-soluble organic solvent, the water-soluble organic solvent is 2-pyrrolidone, and a content (weight %) of 2-pyrrolidone in the ink jet ink is 50% or more with respect to the content (weight %) of the coloring material.

According to another aspect of the present invention, there is provided an ink jet recording method, including ejecting an ink by an ink jet method to perform recording on a recording medium, in which the ink is the above-described ink jet ink.

According to another aspect of the present invention, there is provided an ink cartridge, including an ink storage portion for storing ink, in which the ink is the above-described ink jet ink.

According to another aspect of the present invention, there is provided a recording unit, including: an ink storage portion for storing ink; and a recording head for ejecting the ink, in which the ink is the above-described ink jet ink.

According to another aspect of the present invention, there is provided an ink jet recording apparatus, including: an ink storage portion for storing ink; and a recording head for ejecting the ink, in which the ink is the above-described ink jet ink.

According to the present invention, there can be provided an ink jet ink which is excellent in color developability, has high environmental gas resistance, and is capable of providing an image excellent in bronze resistance.

According to the present invention, there can also be provided an ink jet recording method, an ink cartridge, a recording unit, and an ink jet recording apparatus each using the ink jet ink.

DESCRIPTION OF THE PREFERRED EMBODIMENTS

Figure 1:
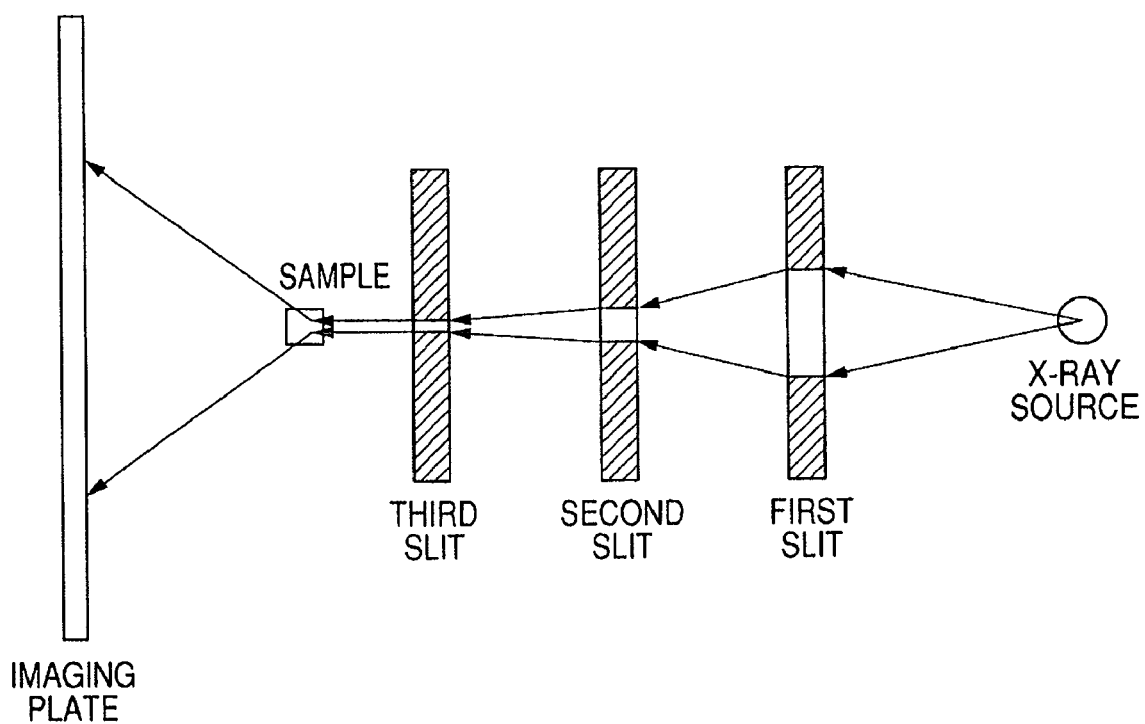
FIG. 1 is a view showing the measurement principle of a small-angle X-ray scattering.

Hereinafter, the present invention will be described in more detail by way of preferred embodiments.

In the present invention, when a coloring material is a salt, the salt is dissociated to ions in ink, but this state is represented by using the phrase "contains a salt" for convenience.

<Ink>

Hereinafter, components constituting the ink jet ink according too the present invention (which may hereinafter be simply referred to as the ink) and the like will be described in details.

In particular, cyan ink tends to be poor in environmental gas resistance out of yellow ink, magenta ink, and the cyan ink each of which is vigorously used as ink jet ink. To cope with the problem of the environmental gas resistance in cyan ink, the present invention aims at providing cyan ink in which, when a recorded product obtained by means of the cyan ink is exposed in an environment having a temperature of 40° C., a humidity of 55%, and an ozone gas concentration of 2 ppm for 20 hours, the reflection density at a 50% duty portion of the recorded product is 83% or more of the reflection density at the 50% duty portion of the recorded product before the exposure. A recorded product obtained by using yellow ink and magenta ink each excellent in environmental gas resistance has excellent environmental gas resistance with which 83% or more of the reflection density remains under the above exposure conditions. Therefore, using cyan ink in which 83% or more of the reflection density remains under the above exposure conditions in combination with yellow ink and magenta ink each excellent in environmental gas resistance, excellent image storage stability can be achieved.

(Coloring material)

[Compound represented by general formula (I) or a salt thereof]

The ink according to the present invention must contain a compound represented by the following general formula (I) or a salt thereof. The compound represented by the following general formula (I) or the salt thereof is a phthalocyanine derivative characterized in that it has a cyan hue and is excellent in environmental gas resistance.

to 3 (provided that l+m+n=3 to 4); and the substitution position of a substituent is 4 position or 4' position.)

In general, when a phthalocyanine derivative is synthesized, it often inevitably contains substitution position isomers which are different in positions at which substituents $R_n$ (n:1 to 16) in the general formula (III) (the positions of carbon atoms on the benzene rings to which $R_1$ to $R_{16}$ are bonded are defined as 1 position to 16 position, respectively) are present. However, in general, those substitution position isomers are not distinguished from one another, and are often regarded as the same derivative.

General formula (III)

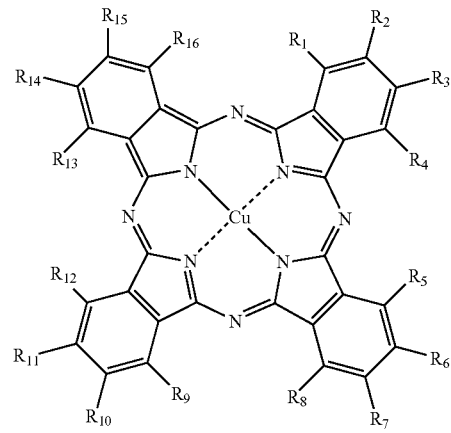

The coloring material to be used in the present invention is a phthalocyanine derivative obtained by selectively introducing an unsubstituted sulfamoyl group (—$SO_2NH_2$) or a substituted sulfamoyl group (a group represented by the general formula (IV)) to only at each of the 4-position and 4'-position in the general formula (I) ($R_2$, $R_3$, $R_6$, $R_7$, $R_{10}$, $R_{11}$, $R_{14}$, and $R_{15}$ in the general formula (III)). The inventors General formula (I)

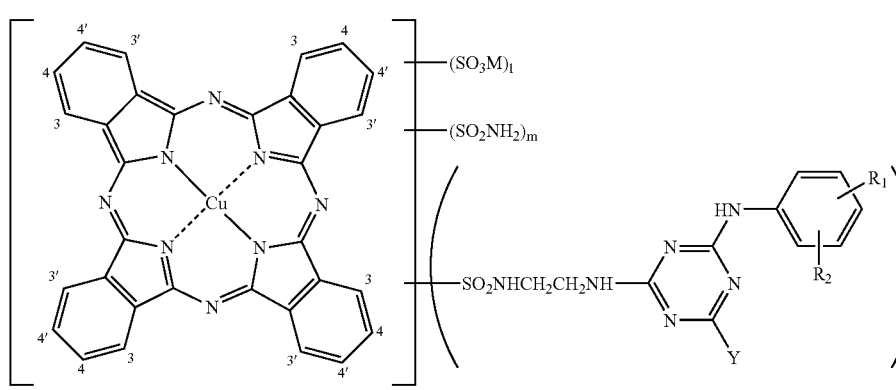

(In the general formula (I): M represents an alkali metal or ammonium; $R_1$ and $R_2$ each independently represent a hydrogen atom, a sulfonic group, or a carboxyl group (provided that $R_1$ and $R_2$ are not simultaneously is hydrogen atom); Y represents a chlorine atom, a hydroxyl group, an amino group, or a monoalkylamino or dialkylamino group; l represents 0 to 2, m represents 1 to 3, and n represents 1 of the present invention have found that a recorded product obtained by means of ink containing such compound is extremely excellent in environmental gas resistance.

The compound represented by the general formula (I) or the salt thereof to be used in the present invention is synthesized by using, as a raw material, a phthalocyanine compound obtained by reacting a 4-sulfophthalic acid derivative, or a 4-sulfophthalic acid derivative and a phthalic (anhydride) derivative, in the presence of a metal compound. The compound or the salt thereof is obtained by converting a sulfonic group in the phthalocyanine compound into a chlorosulfonic group which is then allowed to react with an aminating agent in the presence of an organic amine.

General formula (IV)

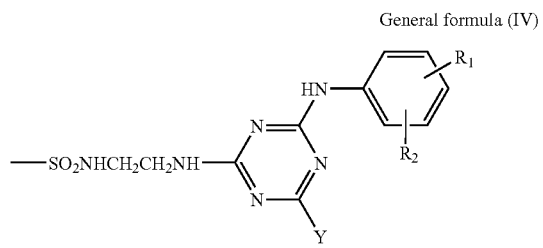

Preferable examples of the substituted sulfamoyl group represented by the general formula (IV) are shown below. Of course, the substituted sulfamoyl group to be used in the present invention is not limited to them. The substituted sulfamoyl group represented by the general formula (IV) is shown in the form of a free acid.

Exemplified substituent 1

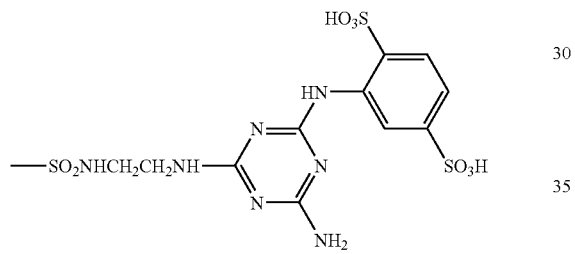

Exemplified substituent 2

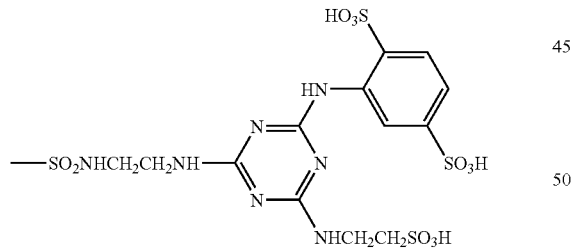

Exemplified substituent 3

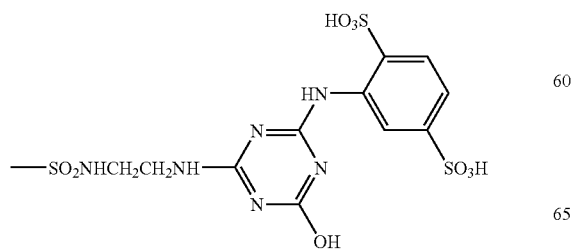

Exemplified substituent 4

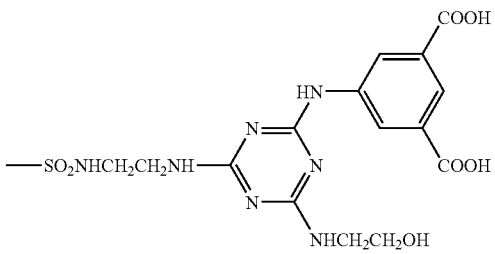

Exemplified substituent 5

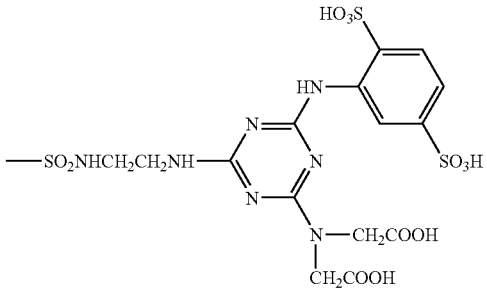

Exemplified substituent 6

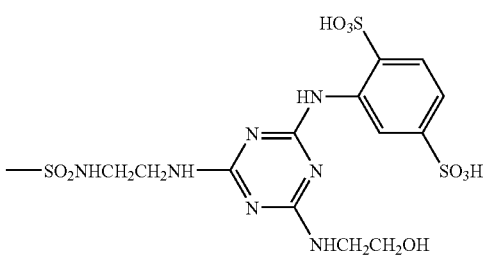

Exemplified substituent 7

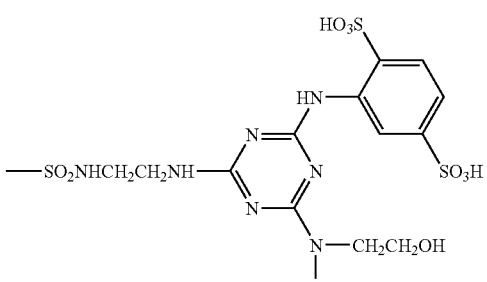

Of those, a compound substituted by Exemplified Substituent 1 above, that is, a compound represented by the following general formula (II) or a salt thereof is most preferable from the viewpoint of its balance between color developability and environmental gas resistance.

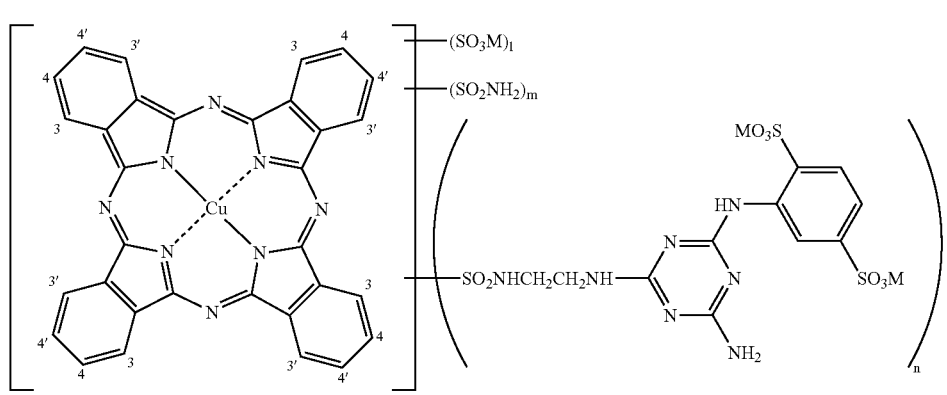

General formula (II)

(In the general formula (II): M represents an alkali metal or ammonium; l represents 0 to 2, m represents 1 to 3, and n represents 1 to 3 (provided that l+m+n=3 to 4); and the substitution position of a substituent is 4 position or 4' position.)

However, even in such a compound as represented by the general formula (I) used in the present invention in which the number of substituents is 3 to 4, that is, l+m+n=3 to 4 and the substitution positions are limited to 4 position or 4' position, a large number of isomers are present as shown in Tables 1 and 2 below, which are different from each other in number of each of a sulfonic group (—$SO_3M$), an unsubstituted sulfamoyl group (—$SO_2NH_2$), and a substituted sulfamoyl group (a group represented by the general formula (IV), each of which is a substituent that substitutes for a phthalocyanine skeleton. The compound represented by the general formula (I) or the salt thereof is a mixture of those isomers, And even compounds having the same structure are found to have considerably different properties depending on the number and kinds of their isomers. A difference in aggregation properties between coloring materials themselves can be given as one example of the properties.

TABLE 1

The number of substituents, the positions of substituents, and the kinds of isomers (for l + m + n = 4)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| l, m, n = 0, 1, 3 | 0 | 0 | 1 | 0 | 3 | 0 |
| | 0 | 0 | 1 | 0 | 2 | 1 |
| | 0 | 0 | 1 | 0 | 1 | 2 |
| | 0 | 0 | 1 | 0 | 0 | 3 |
| | 0 | 0 | 0 | 1 | 3 | 0 |
| | 0 | 0 | 0 | 1 | 2 | 1 |
| | 0 | 0 | 0 | 1 | 1 | 2 |
| | 0 | 0 | 0 | 1 | 0 | 3 |
| l, m, n = 0, 2, 2 | 0 | 0 | 2 | 0 | 2 | 0 |
| | 0 | 0 | 2 | 0 | 1 | 1 |
| | 0 | 0 | 2 | 0 | 0 | 2 |
| | 0 | 0 | 1 | 1 | 2 | 0 |
| | 0 | 0 | 1 | 1 | 1 | 1 |
| | 0 | 0 | 1 | 1 | 0 | 2 |
| | 0 | 0 | 0 | 2 | 2 | 0 |
| | 0 | 0 | 0 | 2 | 1 | 1 |
| | 0 | 0 | 0 | 2 | 0 | 2 |

TABLE 1-continued

The number of substituents, the positions of substituents, and the kinds of isomers (for l + m + n = 4)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| l, m, n = 0, 3, 1 | 0 | 0 | 3 | 0 | 1 | 0 |
| | 0 | 0 | 3 | 0 | 0 | 1 |
| | 0 | 0 | 2 | 1 | 1 | 0 |
| | 0 | 0 | 2 | 1 | 0 | 1 |
| | 0 | 0 | 1 | 2 | 0 | 1 |
| | 0 | 0 | 1 | 2 | 1 | 0 |
| | 0 | 0 | 0 | 3 | 0 | 1 |
| | 0 | 0 | 0 | 3 | 1 | 0 |
| l, m, n = 1, 1, 2 | 1 | 0 | 1 | 0 | 2 | 0 |
| | 1 | 0 | 1 | 0 | 1 | 1 |
| | 1 | 0 | 1 | 0 | 0 | 2 |
| | 1 | 0 | 0 | 1 | 2 | 0 |
| | 1 | 0 | 0 | 1 | 1 | 1 |
| | 1 | 0 | 0 | 1 | 0 | 2 |
| | 0 | 1 | 1 | 0 | 2 | 0 |
| | 0 | 1 | 1 | 0 | 1 | 1 |
| | 0 | 1 | 1 | 0 | 0 | 2 |
| | 0 | 1 | 0 | 1 | 2 | 0 |
| | 0 | 1 | 0 | 1 | 1 | 1 |
| | 0 | 1 | 0 | 1 | 0 | 2 |
| l, m, n = 1, 2, 1 | 1 | 0 | 2 | 0 | 1 | 0 |
| | 1 | 0 | 2 | 0 | 0 | 1 |
| | 1 | 0 | 1 | 1 | 1 | 0 |
| | 1 | 0 | 1 | 1 | 0 | 1 |
| | 1 | 0 | 0 | 2 | 1 | 0 |
| | 1 | 0 | 0 | 2 | 0 | 1 |
| | 0 | 1 | 2 | 0 | 1 | 0 |
| | 0 | 1 | 2 | 0 | 0 | 1 |
| | 0 | 1 | 1 | 1 | 1 | 0 |
| | 0 | 1 | 1 | 1 | 0 | 1 |
| | 0 | 1 | 0 | 2 | 1 | 0 |
| | 0 | 1 | 0 | 2 | 0 | 1 |
| l, m, n = 2, 1, 1 | 2 | 0 | 1 | 0 | 1 | 0 |
| | 2 | 0 | 1 | 0 | 0 | 1 |
| | 2 | 0 | 0 | 1 | 1 | 0 |
| | 2 | 0 | 0 | 1 | 0 | 1 |
| | 1 | 1 | 1 | 0 | 1 | 0 |
| | 1 | 1 | 1 | 0 | 0 | 1 |
| | 1 | 1 | 0 | 1 | 1 | 0 |
| | 1 | 1 | 0 | 1 | 0 | 1 |
| | 0 | 2 | 1 | 0 | 1 | 0 |
| | 0 | 2 | 1 | 0 | 0 | 1 |
| | 0 | 2 | 0 | 1 | 1 | 0 |
| | 0 | 2 | 0 | 1 | 0 | 1 |

TABLE 2

The number of substituents, the positions of substituents, and the kinds of isomers (for l + m + n = 3)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| l, m, n = 0, 1, 2 | 0 | 0 | 1 | 0 | 2 | 0 |
| | 0 | 0 | 1 | 0 | 1 | 1 |
| | 0 | 0 | 1 | 0 | 0 | 2 |
| | 0 | 0 | 0 | 1 | 2 | 0 |
| | 0 | 0 | 0 | 1 | 1 | 1 |
| | 0 | 0 | 0 | 1 | 0 | 2 |
| l, m, n = 0, 2, 1 | 0 | 0 | 2 | 0 | 1 | 0 |
| | 0 | 0 | 2 | 0 | 0 | 1 |
| | 0 | 0 | 1 | 1 | 1 | 0 |
| | 0 | 0 | 1 | 1 | 0 | 1 |
| | 0 | 0 | 0 | 2 | 1 | 0 |
| | 0 | 0 | 0 | 2 | 0 | 1 |
| l, m, n = 1, 1, 1 | 1 | 0 | 1 | 0 | 1 | 0 |
| | 1 | 0 | 1 | 0 | 0 | 1 |
| | 1 | 0 | 0 | 1 | 1 | 0 |
| | 1 | 0 | 0 | 1 | 0 | 1 |
| | 0 | 1 | 1 | 0 | 1 | 0 |
| | 0 | 1 | 1 | 0 | 0 | 1 |
| | 0 | 1 | 0 | 1 | 1 | 0 |
| | 0 | 1 | 0 | 1 | 0 | 1 |

In general, a phthalocyanine-based coloring material has higher aggregation properties than coloring materials having other structures (for example, a triphenylmethane-based, azo-based, or xanthene-based coloring material). The enhancement of the aggregation properties elevates fastness. Meanwhile, a coloring material having high aggregation properties shows high aggregation properties of the coloring material in ink. Therefore, the occurrence of the bronze phenomenon that results in a reduction in image quality when a letter imprinted on a recording medium by means of the coloring material tends to be remarkable.

In contrast, when a coloring material has significantly low aggregation properties, the fastness (especially environmental gas resistance) of the coloring material reduces. Therefore, a recorded product obtained by means of ink containing the coloring material may be unable to obtain image storage stability at the same level as that of each of yellow ink and magenta ink each of which is excellent in environmental gas resistance.

Accordingly, when the compound represented by the general formula (I) or the salt thereof is used as a coloring material, the aggregation properties of the coloring material must be controlled in such a manner that the occurrence of the bronze phenomenon can be suppressed and desired environmental gas resistance can be obtained.

Comparison between the compound represented by the general formula (I) or the salt thereof, which is a coloring material to be used in the ink of the present invention, and C.I. Direct Blue 199, C.I. Direct Blue 86, or the like, which is a representative coloring material having the same skeleton as that of the above coloring material and conventionally used for ink, shows the following. In the former coloring material, the molecular weight of a substituent that substitutes for a phthalocyanine skeleton is large, and the molecular weight of the entire coloring material is also large, so coloring efficiency per the same weight % reduces as compared to that of the latter coloring material. Therefore, the coloring material concentration in ink must be set to be high in order to obtain color developability comparable to that of ink containing a conventional coloring material. In particular, the coloring material content (weight %) is preferably 3.0 weight % or more with respect to the total weight of the ink in order to obtain color developability comparable to that of ink containing a conventional coloring material when a letter is printed on plain paper or the like having low color developability by means of the ink. The content is preferably 10.0 weight % or less in order to sufficiently satisfy reliability such as adherence.

It should be noted that, when the coloring material concentration in ink is high, the aggregation of a coloring material on a recording medium proceeds, and hence the occurrence of the bronze phenomenon tends to be more remarkable. Accordingly, even when the content (that is, the coloring material concentration) of the compound represented by the general formula (I) or the salt thereof, which is a coloring material to be used in the ink of the present invention, is as high as 3.0 weight % or more with respect to the total weight of the ink, the aggregation properties of the coloring material must be controlled in such a manner that the occurrence of the bronze phenomenon can be suppressed and desired environmental gas resistance can be obtained.

On the basis of the foregoing finding, the inventors of the present invention have made extensive studies by paying attention to the aggregation properties of the compound represented by the general formula (I) or the salt thereof. As a result, the inventors have found a method involving changing the kind of a substituent for a coloring material which is the compound represented by the general formula (I) or the salt thereof to control the aggregation properties of the coloring material, to provide excellent color developability, to suppress the occurrence of the bronze phenomenon, and to enhance environmental gas resistance. Thus, the inventors have completed the present invention

[Measurement of Aggregation Properties of coloring material]

Small-angle X-ray scattering method is applicable to the measurement of the aggregation properties of a coloring material to be used in the present invention.

As described in, for example, "Saishin Colloid Kagaku" (Latest Colloid Chemistry) (Kodansha Scientific, Fumio Kitahara and Kunio Furusawa) and "Hyomen Jotai To Colloid Jotai" (Surface State and Colloid State) (Tokyo Kagaku Dozin, Co., Ltd., Masayuki Nakagaki), the small-angle X-ray scattering method is an approach that has been generally used for calculating a distance between colloid particles in a colloidal solution.

The outline of a small-angle X-ray scattering apparatus will be described with reference to FIG. 1 showing the measurement principle of the small-angle X-ray scattering method. The focal spot size of each of X-rays generated from an X-ray source is reduced to about several millimeters during the passing of the X-rays through first to third slits, and a sample solution is irradiated with the X-rays. The X-rays with which the sample solution is irradiated are scattered by particles in the sample solution before the X-rays are detected on an imaging plate. Since the scattered X-rays interfere with each other because of an optical path difference between them, a distance d value between particles can be determined on the basis of Bragg equation (the following expression (1)) using the resultant $\theta$ value. When particles are arranged to be equidistance, the d value determined here is considered to be a distance from the center of a particle to the center of an adjacent particle.

$$d = \lambda/2 \sin\theta \qquad \text{Eq. (1)}$$

(In the expression (1), λ represents the wavelength of an X-ray, d represents the distance between particles, and θ represents a scatter angle.)

Figure 2:
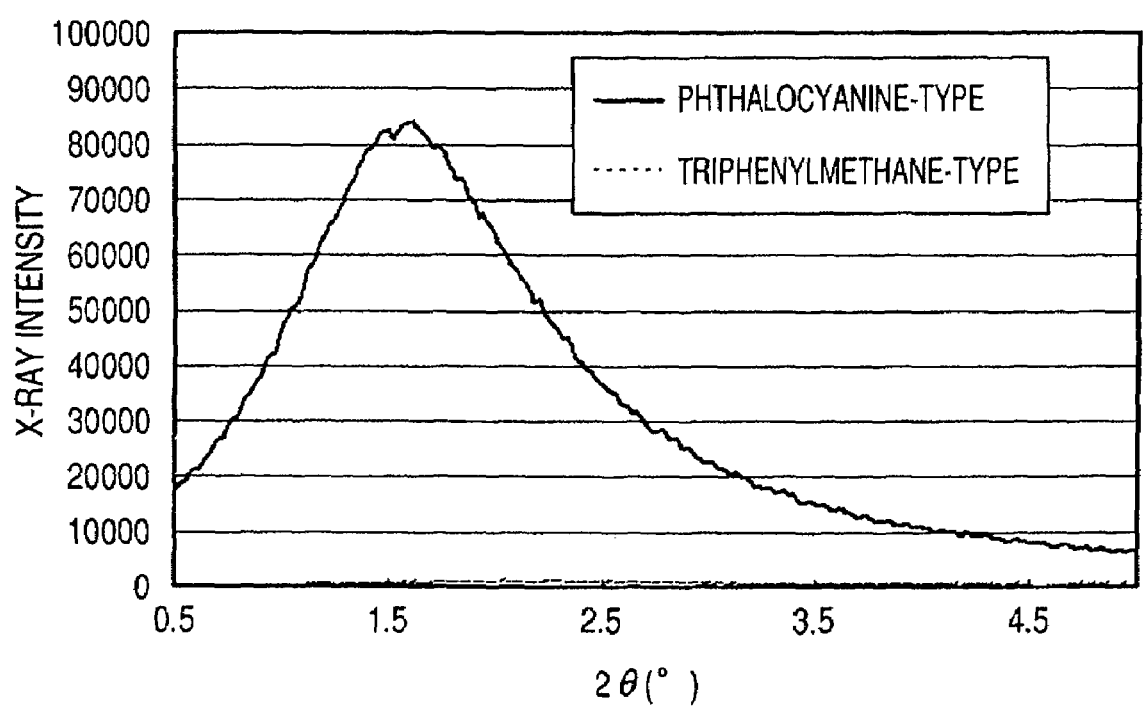
FIG. 2 is a small-angle X-ray scattering profile of each of a phthalocyanine-based coloring material and a triphenylmethane-based coloring material.

In general, no peak occurs in a scattering angle profile when particles in a solution are not regularly arranged. In the case of an aqueous solution of the coloring material (phthalocyanine-based coloring material) used in the present invention, a strong peak having the maximum value in the range of 2θ=0° to 5° is detected, and particles (molecular aggregates) formed by the aggregation of phthalocyanine-based coloring material molecules are found to be arranged by a certain regulation. FIG. 2 shows the scatter angle profile in a 10-weight % aqueous solution of each of a triphenylmethane-based coloring material having a structure represented by Compound (1) below and a phthalocyanine-based coloring material having the structure represented by the general formula (I). FIG. 2 shows that phthalocyanine-based coloring materials specifically have scattering angle peaks even when they have the same cyan hue. In other words, several phthalocyanine molecules aggregate in an aqueous solution of a phthalocyanine-based coloring material to form molecular aggregates. In addition, the distances between the molecular aggregates have such a constant distribution as may be represented by a scattering angle profile.

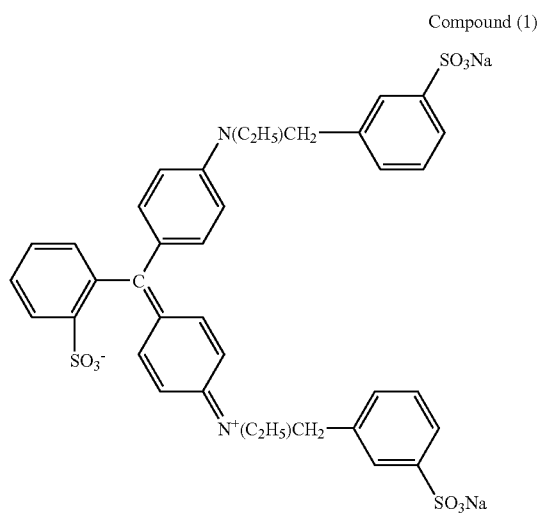

Compound (1)

Figure 3:
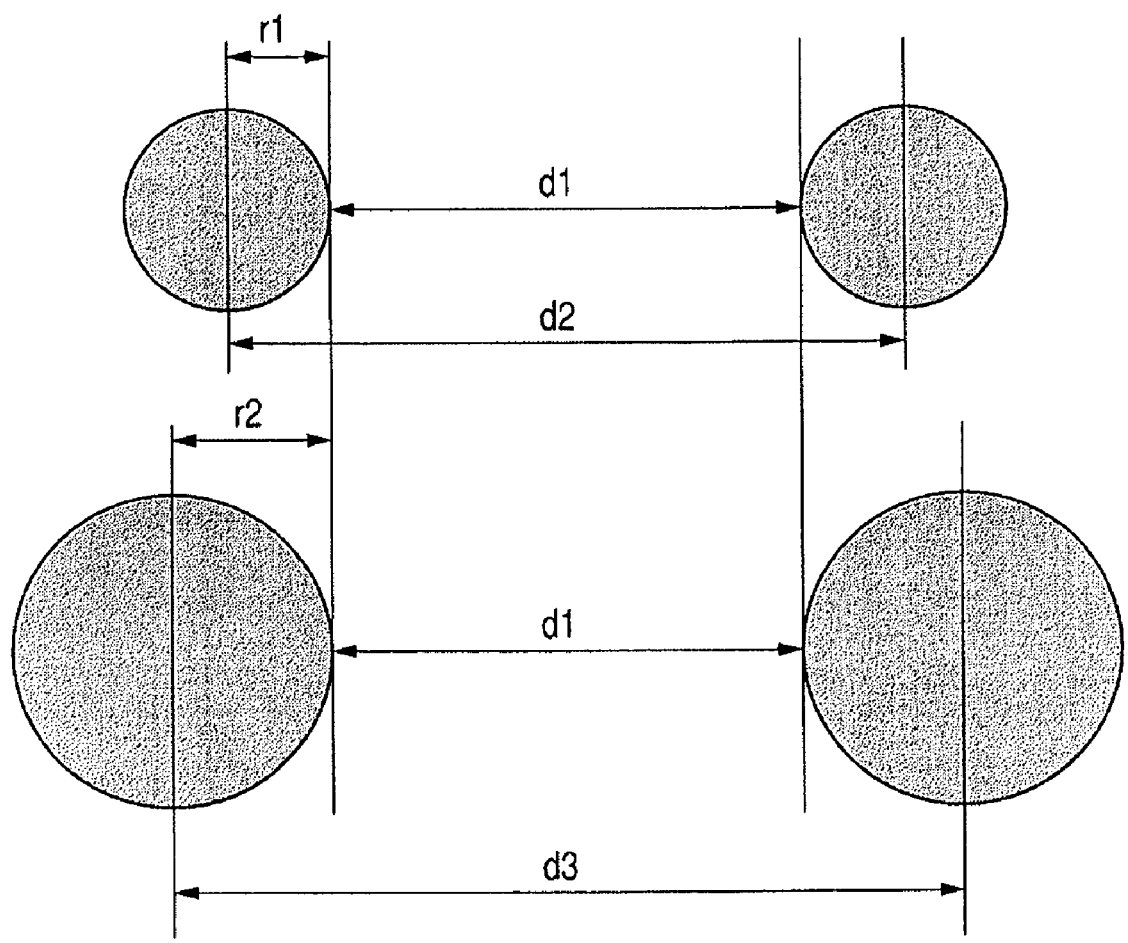
FIG. 3 is a conceptual diagram of the dispersion distance between molecular aggregates of a phthalocyanine-based coloring material.

FIG. 3 is a schematic view of a dispersion distance between molecular aggregates of a phthalocyanine-based coloring material. As shown in FIG. 3, the radius of a certain molecular aggregate of the phthalocyanine-based coloring material is denoted by r1 and a distance between molecular aggregates is denoted by d1. Assuming that d1 is always constant when the structure of the phthalocyanine-based coloring material remains unchanged, the d value measured by a small-angle X-ray scattering method is considered to increase from d2 to d3 as the radius of the molecular aggregate formed by the phthalocyanine-based coloring material increases from r1 to r2. Accordingly, the d value measured by the above method is considered to be an indication of the size of the molecular aggregate of the phthalocyanine-based coloring material, and the size of the molecular aggregate formed by coloring material molecules is expected to increase as the d value increases.

Investigation into the relationship between the d value in ink containing a phthalocyanine-based coloring material and the bronze phenomenon has revealed that in the case of phthalocyanine-based coloring materials represented by the same structural formula, the bronze phenomenon is more likely to occur when the d value is larger. Taking into consideration the fact that the bronze phenomenon occurs owing to the aggregation of coloring material molecules on a recording medium, it has been supported that there is a correlation between the d value described above and the size of a molecular aggregate.

A peak shape in a scatter angle profile indicates the distribution of a distance between molecular aggregates, that is, the distribution of the dispersion distance between the molecular aggregates. Taking into consideration the above-described fact that the dispersion distances are an indication of the size of a molecular aggregate, such scattering angle profile is expected to indicate the distribution of the sizes of molecular aggregates in a solution. In other words, assuming that the peak area of a scatter angle profile shows the sizes of the entire molecular aggregates in a solution, the bronze phenomenon tends to be more likely to occur as the d value is larger, that is, the frequency of large molecular aggregate is higher. Therefore, reducing the frequency of large molecular aggregates which are apt to cause the bronze phenomenon is expected to be capable of suppressing the occurrence of the bronze phenomenon. However, in, the case of ink containing only significantly small molecular aggregates, the environmental gas resistance of the ink is lowered, although the bronze phenomenon is less likely to occur. Accordingly, the sizes of molecular aggregates (the absolute value of the d value) must be appropriately controlled for suppressing the occurrence of the bronze phenomenon and for obtaining environmental gas resistance.

In general, when the sizes of coloring material molecule have a certain frequency distribution, the threshold value of the visual sense which is the limit of the observability of a human being is said to be 25% of the entire amount. In view of the above, the d value of the point at which large molecular aggregates causative of the bronze phenomenon comes to account for 25% or less of the entire aggregates, i.e., the point at which small molecular aggregates which hardly cause the bronze phenomenon accounts for 75% or more of the entire aggregates is defined as a $d_{75}$ value and the $d_{75}$ value is so controlled as to fall within a specific range, whereby ink which suppresses the occurrence of the bronze phenomenon and has high environmental gas resistance can be obtained.

In actuality, according to investigation into the correlation between each of a $d_{peak}$ value calculated from the peak of a 2θ value in a scattering angle profile and the above-described $d_{75}$ value, and the occurrence level of the bronze phenomenon, it has been found that the $d_{75}$ value in which a distribution factor of the sizes of the entire molecular aggregates is taken into account has a stronger correlation with the bronze phenomenon than the $d_{peak}$ value. A base line for determining the 2θ value is drawn in the range of 0.50° to 5°.

In view of the foregoing, the inventors of the present invention have conducted the following experiment using a compound prepared by changing the number, kinds, and substitution positions of substituents in the compound represented by the general formula (I) or the salt thereof, which is a phthalocyanine-based coloring material, that is a coloring material with its aggregation properties controlled. Ink containing the coloring material was prepared, and the scattering angle profile of the ink was measured to calculate the $d_{75}$ value. Next, each coloring material was evaluated for aggregation properties on the basis of the resultant $d_{75}$ value. As a result, it is confirmed that, when ink had the $d_{75}$ value of 6.50 nm or more and 7.10 nm or less, the ink effectively suppressed the occurrence of the bronze phenomenon and had high environmental gas resistance. The result also confirmed that, when ink had a $d_{75}$ value of 6.70. nm or more and 7.10 nm or less, the ink particularly effectively suppressed the occurrence of the bronze phenomenon and had high environmental gas resistance. Namely, in the case where the aggregation properties of the compound represented by the general formula (I) or the salt thereof as a coloring material is controlled in such a manner that the $d_{75}$ value of the ink containing the coloring material falls within the above range, the ink is found to suppress the occurrence of the bronze phenomenon and have high environmental gas resistance even when the coloring material concentration is set to be high in order to obtain good color developability.

A molecular density in a solution must be kept constant in order to measure the d value by a small-angle X-ray scattering method. Therefore, the d value is preferably measured by using ink with its coloring material concentration kept constant. In the present invention, a scattering angle profile was measured by using ink prepared in such a manner that the coloring material content (weight %) would be 3.0 weight % with respect to the total weight of the ink. When ink had a coloring material content in excess of 3.0 weight %, the ink was diluted with pure water to have a coloring material concentration of 3.0 weight %, and the scatter angle profile of the diluted ink was measured. The fact that ink has a coloring material content of 3.0 weight % can be examined on the basis of the fact that the absorbance measured after diluting 1,000 times the ink with pure water is in the range of 1.05 to 1.15.

The conditions under which the absorbance is measured are as follows.

Spectrophotometer: Self-recording spectrophotometer (trade name: U-3300; manufactured by Hitachi, Ltd.)

Measurement cell: 1 cm quartz cell

Sampling interval: 0.1 nm

Scanning rate: 30 nm/min

Number of measurements: Measurement is performed five times to take the average value of the five measurements.

The aggregation properties of a coloring material described above has a correlation also with the maximum absorption wavelength (λmax) in an absorption spectrum. Ink having higher molecular aggregation properties (a higher $d_{75}$ value) tends to have smaller λmax. Therefore, a coloring material can be evaluated for its aggregation properties by means of λmax having a correlation with the $d_{75}$ value. In this case, it has been found that ink effectively suppresses the occurrence of the bronze phenomenon and has high environmental gas resistance when λmax in the ink diluted 2,000 times with pure water is 612.0 nm or more and 616.0 nm or less. It has also been found that ink particularly effectively suppresses the occurrence of the bronze phenomenon and has high environmental gas resistance when the λmax is 612.0 nm or more and 614.0 nm or less. In other words, in the case where the aggregation properties of the compound represented by the general formula (I) or the salt thereof as a coloring material is controlled in such a manner that the max of the ink containing the coloring material falls within the above range, the ink is found to suppress the occurrence of the bronze phenomenon and have high environmental gas resistance even when the coloring material concentration is set to be high in order to obtain good color developability. The conditions under which the maximum absorption wavelength is measured are the same as the above-described conditions under which the absorbance is measured.

The coloring material to be used in the present invention is known to be less likely to aggregate when it has a smaller number of unsubstituted sulfamoyl group and a larger number of substituted sulfamoyl groups or of sulfonic groups. In particular, in the case where a coloring material satisfies the requirement concerning the $d_{75}$ value in the present invention, the coloring material preferably contains a compound in which the number of substituents $1 \geqq 1$ in the compound represented by the general formula (I) or the salt thereof, or in the compound represented by the general formula (II) or the salt thereof because the aggregation of the coloring material can be suppressed.

[Method of Testing Coloring Material]

Exemplified Compound 1 (the compound represented by the general formula (II) or the salt thereof), which is an example of the coloring material used in the present invention, can be tested by the following methods (1) to (3) each of which involves the use of high performance liquid chromatography (HPLC).

(1). Retention time of the peak (2) Maximum absorption wavelength in the peak of (1)

(3) M/Z (posi) of weight spectrum in the peak of (1)

Analysis conditions for high performance liquid chromatography are as shown below. An ink solution diluted 200 times with pure water is analyzed by means of high performance liquid chromatography under the following conditions to measure the retention time of a main peak and the maximum absorption wavelength of a peak.

Column: Symmetry C18 2.1 mm×150 mm

Column temperature: 40° C.

Flow rate: 0.2 ml/min

PDA: 210 nm to 700 nm

Mobile phase and gradient condition: Table 3

TABLE 3

|  | 0–15 min | 15–30 min |
|---|---|---|
| A Water | 87.5% → 0% | 0% |
| B Acetonitrile | 10% → 97.5% | 97.5% |
| C 200-mmol/l aqueous solution of ammonium acetate | 2.5% | 2.5% |

In addition, analysis conditions for a weight spectrum are as shown below. The weight spectrum of the resultant peak is measured under the following conditions, and the M/Z (posi) is measured.

Ionization Method

| ESI | Capillary voltage | 3.1 kV |
|---|---|---|
|  | Desolvating gas | 300° C. |
|  | Ion source temperature | 120° C. |
| Detector | posi | 40 V 500–2,000 amu/0.9 sec |

Table 4 shows the values of the retention time, maximum absorption wavelength, and M/Z of Exemplified Compound 1. When a coloring material has values shown in Table 4, the coloring material can be judged to be usable in the present invention. In the coloring material used in the present invention, the peak ratio of the weight spectrum obtained from a peak of high performance liquid chromatography (HPLC) varies depending on a mixing ratio of isomers different from each other in number, kinds, and substitution positions of substituents in the coloring material, but the peak of M/Z described in Table 4 below is characterized in that it is always detected. Therefore, the present method of testing a coloring material is effective in examining whether ink contains the coloring material used in the present invention.

TABLE 4

| Retention time [min] | Maximum absorption wavelength[nm] | M/Z(Posi) |
|---|---|---|
| 6.9–7.2 | 600–620 | 1670–1672 |

(Aqueous Medium)

An ink composition of the present invention can use water or an aqueous medium which is a mixed solvent of water and any one of various water-soluble organic solvents.

There is no particular limitation concerning the water-soluble organic solvent as long as they are water-soluble, and preferable examples thereof include: an alkyl alcohol having 1 to 4 carbon atoms such as ethanol, isopropanol, n-butanol, isobutanol, 2-butanol, or 3-butanol; a carboxylic acid amide such as N,N-dimethylformamide or N,N-dimethylacetamide; a ketone or a keto alcohol such as acetone, methyl ethyl ketone, or 2-methyl-2-hydroxypentan-4-one; a cyclic ether such as tetrahydrofuran or dioxane; a polyhydric alcohol such as glycerin, ethylene glycol, diethylene glycol, triethylene glycol, tetraethylene glycol, 1,2 or 1,3-propylene glycol, 1,2 or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, an acetylene glycol derivative, or trimethylolpropane; an alkyl ether of a polyhydric. alcohol such as ethylene glycol monomethyl (or ethyl) ether, diethylene glycol monomethyl (or ethyl) ether, or triethylene glycol monoethyl (or butyl) ether; a heterocyclic compound such as 2-pyrrolidone, N-methyl-2-pyrrolidone, 1,3-dimethyl-2-imidazolidinone, or N-methylmorpholine; a sulfur-containing compound such as dimethyl sulfoxide; and urea and a urea derivative. Each of those water-soluble organic solvents may be used alone, or two or more of them may be used as a mixture.

The content of such water-soluble organic solvent is preferably 5.0 weight % to 90.0 weight %, or more preferably 10.0 weight % to 50.0 weight % with respect to the total weight of ink. The reason for the above is as follows. If the content is smaller than the range, reliability for ejection properties, etc. may lower when the water-soluble organic solvent is used for ink jet ink, on the other hand, if the content is larger than the range, insufficient ink supply due to an increase in viscosity of ink may occur.

Deionized water (ion-exchanged water) is preferably used as water. The water content is preferably 10.0 weight % to 90.0 weight % with respect to the total weight of ink.

In the present invention, out of the above-described water-soluble organic solvents, 2-pyrrolidone, polyethylene glycol (having a molecular weight of 200 or more), or an alkyl ether of a polyhydric alcohol such as triethylene glycol monoethyl ether is preferably used in combination with the compound represented by the general formula (I) or the salt thereof because the combined use has a suppressing effect on the occurrence of the bronze phenomenon. In particular, 2-pyrrolidone is more preferably used in combination with the compound represented by the general formula (I) or the salt thereof because the combined use has a particularly effective suppressing effect on the occurrence of the bronze phenomenon.

The mechanism for suppressing the occurrence of the bronze phenomenon by those specific water-soluble organic solvents is unclear, but is estimated to be as follows. The $d_{75}$ value of ink obtained by a small-angle X-ray scattering method does not change depending on the presence or absence of those specific water-soluble organic solvents in the ink. In view of this, those specific water-soluble organic solvents do not change the aggregation properties of a coloring material in the ink, and are capable of suppressing the aggregation of molecular aggregates of the coloring material on the recording medium. The content (weight %) of those specific water-soluble organic solvents in ink is preferably 50.0% or more with respect to the coloring material content (weight %) in order for the effect to be exhibited by incorporating those specific water-soluble organic solvents into the ink.

(Other Additive)

In addition, in the present invention, various additives such as a surfactant, a pH adjustor, a rust inhibitor, an antiseptic, an antifungus agent, a chelating agent, a UV absorber, a viscosity modifier, a defoaming agent, and a water-soluble polymer may be incorporated as required.

Specific examples of the surfactant include an anionic surfactant, an ampholytic surfactant, a cationic surfactant, and a nonionic surfactant.

Specific examples of the anionic surfactant include: an alkyl sulfocarboxylate; an α-olefin sulfonate; a polyoxyethylene alkyl ether acetate; N-acylamino acid or a salt thereof; an N-acylmethyltaurine salt; an alkyl sulfonate polyoxyalkyl ether sulfonate; an alkyl sulfonate polyoxyethylene alkyl ether phosphate; resin acid soap; a castor oil sulfonate; lauryl alcohol sulfonate; an alkyl phenol phosphate; an alkyl phosphate; an alkyl allyl sulfonate; a diethyl sulfosuccinate; and a diethyl hexyl sulfosuccinate dioctyl sulfosuccinate.

Specific examples of the cationic surfactant include a 2-vinylpyridine derivative and a poly4-vinylpyridine derivative. Examples of the ampholytic surfactant include lauryl dimethyl aminoacetic acid betaine, 2-alkyl-N-carboxymethyl-N-hydroxyethylimidazolinium betaine, coconut oil fatty amide propyl dimethyl aminoacetic acid betaine, polyoctyl polyamino ethyl glycin, and other imidazoline derivatives.

Specific examples of the nonionic surfactant include: ethers such as polyoxyethylene nonyl phenyl ether, polyoxyethylene octyl phenyl ether, polyoxyethylene dodecyl phenyl ether, polyoxyethylene lauryl ether, polyoxyethylene oleyl ether, polyoxyethylene alkyl ether, and polyoxyaralkyl alkyl ether; esters such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and acetylene glycol-based nonionic surfactants such as 2,4,7,9-tetramethyl-5-decyne-4,7-diol, 3,6-dimethyl-4-octyne-3,6-diol, and 3,5-dimethyl-1-hexyen-3-ol (for example, Acetylenol EH manufactured by Kawaken Fine Chemicals Co., Ltd. and Surfynol 104, 82, and 465, and Olfin STG manufactured by Nissin Chemical Industry.Co., Ltd.).

Any substance can be used as a pH adjustor as long as the substance is capable of adjusting the pH of ink to fall within the range of 6.0 to 11.0. Examples of such substance include: alcoholamine compounds such as diethanolamine, triethanolamine, isopropanolamine, and trishydroxymethylaminomethane; hydroxides of alkali metals such as lithium hydroxide and potassium hydroxide; ammonium hydroxide; and carbonates of alkali metals such as lithium carbonate, sodium carbonate, and potassium carbonate. Of those, alcoholamine compounds such as diethanolamine, triethanolamine, isopropanolamine, and trishydroxymethylaminomethane, and carbonates of alkali metals such as lithium carbonate, sodium carbonate, and potassium carbonate are preferable because each of them has a suppressing effect on the occurrence of the bronze phenomenon.

Specific examples of the antiseptic and the antifungus agent include organic sulfur-based, organic nitrogen sulfur-based, organic halogen-based, haloallylsulfone-based, iodopropagii-based, N-haloalkylthio-based, benthiazole-based, nithochirile-based, pyridine-based, 8-oxyquinoline-based, benzothiazole-based, isothiazoline-based, dithiol-based, pyridine oxide-based, nitropropane-based, organotin-based, phenol-based, quaternary ammonium salt-based, triazine-based, thiadiazine-based, anilide-based, adamantane-based, dithiocarbamate-based, brominated indanone-based, benzyl bromoacetate-based, and inorganic salt-based compounds.

An example of the organic halogen-based compound includes pentachlorophenol sodium. An example of the pyridine oxide-based compound includes 2-pyridinethiol-oxide sodium. An example of the inorganic salt-based compound includes soda acetic, anhydride. Examples of the isothiazoline-based compound include: 1,2-benzoisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, and 5-chloro-2-methyl-4-isothiazolin-3-one calcium chloride. Other specific examples of the antiseptic and the antifungus agent include soda sorbate sodium benzoate such as Proxel GXL (S); and Proxel XL-2 (S) manufactured by Avecia.

Examples of the chelating agent include sodium citrate, sodium ethylenediamine tetraacetate, sodium dinitrotriacetate, sodium hydroxyethylethylenediamine triacetate, sodium diethylenetriamine pentaacetate, and sodium uramil diacetate.

Examples of the rust inhibitor include an acid sulfite, sodium thiosulfate, ammonium thioglycolate, diisopropylammonium nitrite; pentaerythritol tetranitrate, and dicyclohexylammonium nitrite.

Examples of the UV absorber include a benzophenone-based compound, a benzotriazole-based compound, a cinnamic acid-based compound, a triazine-based compound, a stilbene-based compound, or compounds that absorb ultraviolet light to emit fluorescence typified by a benzoxazole-based compound, so-called fluorescent bleaches.

Examples of the viscosity modifier include water-soluble polymer compounds in addition to water-soluble organic solvents, and examples of the water-soluble polymer compounds include polyvinyl alcohol, a cellulose derivative, polyamine, and polyimine.

A fluorine-based or silicone-based compound is used as the defoaming agent as required.

<Recording Medium>

Any recording medium can be used for forming an image by means of the ink of the present invention as long as recording is performed by applying the ink to the recording medium.

The present invention is applicable to a recording medium in which a coloring material such as a pigment is adsorbed to a fine particle forming a porous structure in an ink-receiving layer and an image is formed from at least the fine particle having adsorbed thereto the coloring material, and the present invention is particularly suitable for the case where an ink jet method is used. Such ink jet recording medium is preferably of a so-called absorption type in which ink is absorbed by a gap formed in an ink-receiving layer on a support.

An absorption type ink-receiving layer is constituted as a porous layer mainly composed of a fine particle and containing a binder and any other additive as required. Specific examples of the fine particle include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them are used. Examples of a binder that is suitably used include a water-soluble polymer and a latex. Examples of an available binder include: polyvinyl alcohol or a denatured product thereof; starch or a denatured product thereof; gelatin or a denatured product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-denatured polymer latex, and an ethylene-vinyl acetate copolymer; polyvinyl pyrrolidone; maleic anhydride or a copolymer thereof; and an acrylate copolymer. Two or more kinds of them can be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent bleach, a UV absorber, and an antioxidant.

In particular, a recording medium having formed thereon an ink-receiving layer mainly composed of fine particles having an average particle size of 1 μm or less is preferably used in the present invention. Specific examples of the fine particles include silica fine particles and aluminum oxide fine particles. Preferable silica fine particles are silica fine particles typified by colloidal silica. Colloidal silica, which itself is available from the market, is particularly preferably that described in Japanese Patent No. 2803134 or Japanese Patent No. 2881847. Preferable aluminum oxide fine particles are alumina hydrate fine particles and the like. An alumina hydrate represented by the following general formula can be exemplified as one example of such alumina hydrate fine particles.

$$Al_2O_{3-n}(OH)_{2n} \cdot mH_2O$$

(In the formula, n represents an integer of 1, 2, or 3, and m represents a value of 0 to 10, or preferably 0 to 5; provided, however, that m and n are not simultaneously 0. m may be or may not be an integer because $mH_2O$ also represents an aqueous phase that can desorb and is not involved in the formation of an $mH_2O$ crystal lattice in many cases. In addition, heating such kind of material may cause m to reach 0.)

An alumina hydrate can be produced by means of a conventionally known method such as: the hydrolysis of aluminum alkoxide or sodium aluminate described in U.S. Pat. No. 4,242,271 or U.S. Pat. No. 4,202,870; or a method involving adding an aqueous solution of sodium sulfate, aluminum chloride, or the like to an aqueous solution of sodium aluminate or the like to perform neutralization described in Japanese Publication No. H57-44605.

The recording medium preferably has a support for supporting the above-described ink-receiving layer. Any support can be use without any particular limitation as long as its ink-receiving layer can be formed of the above-described porous fine particles and the support provides rigidity such that the support can be conveyed by a conveying mechanism of an ink jet printer or the like. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer added with a white pigment or the like.

<Ink Jet Recording Method>

The ink according to the present invention is particularly suitably used for an ink jet recording method including the step of ejecting the ink by means of an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by means of the ink according to the present invention includes an ink cartridge including an ink storage portion for storing the ink.

<Recording Unit>

An example of a recording unit suitable for performing recording by means of the ink according to the present invention includes a recording unit including: an ink storage portion for storing the ink and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by means of the ink according to the present invention includes a recording apparatus in which thermal energy corresponding to a recording signal is applied to ink in the chamber of a recording head having an ink storage portion for storing the ink to generate an ink droplet by virtue of the energy.

Hereinafter, the schematic constitution of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion for protecting them and providing them with design to achieve a role of each mechanism. Hereinafter, the outline of each of them will be described.

Figure 4:
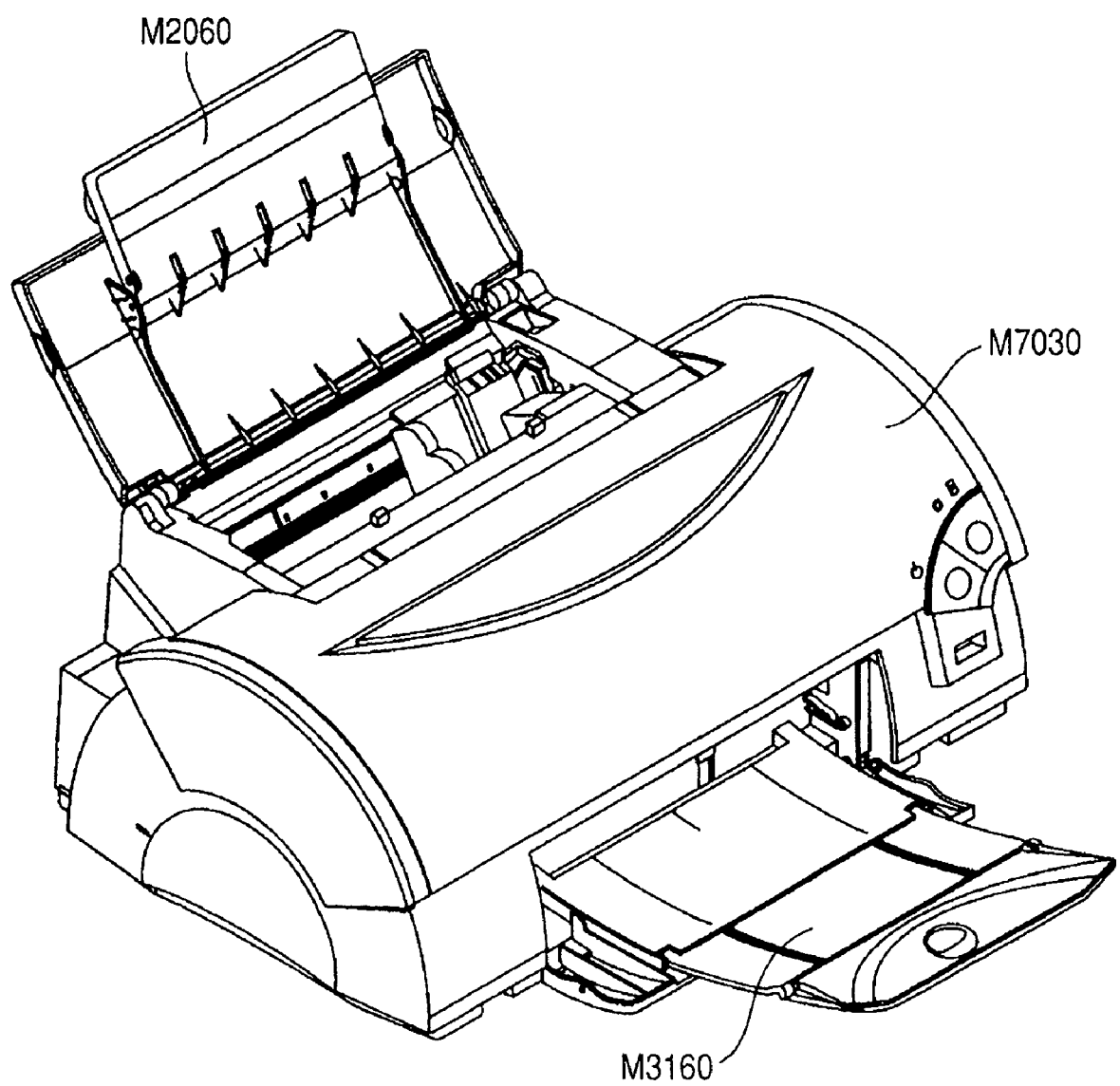
FIG. 4 is a perspective view of a recording apparatus.
Figure 5:
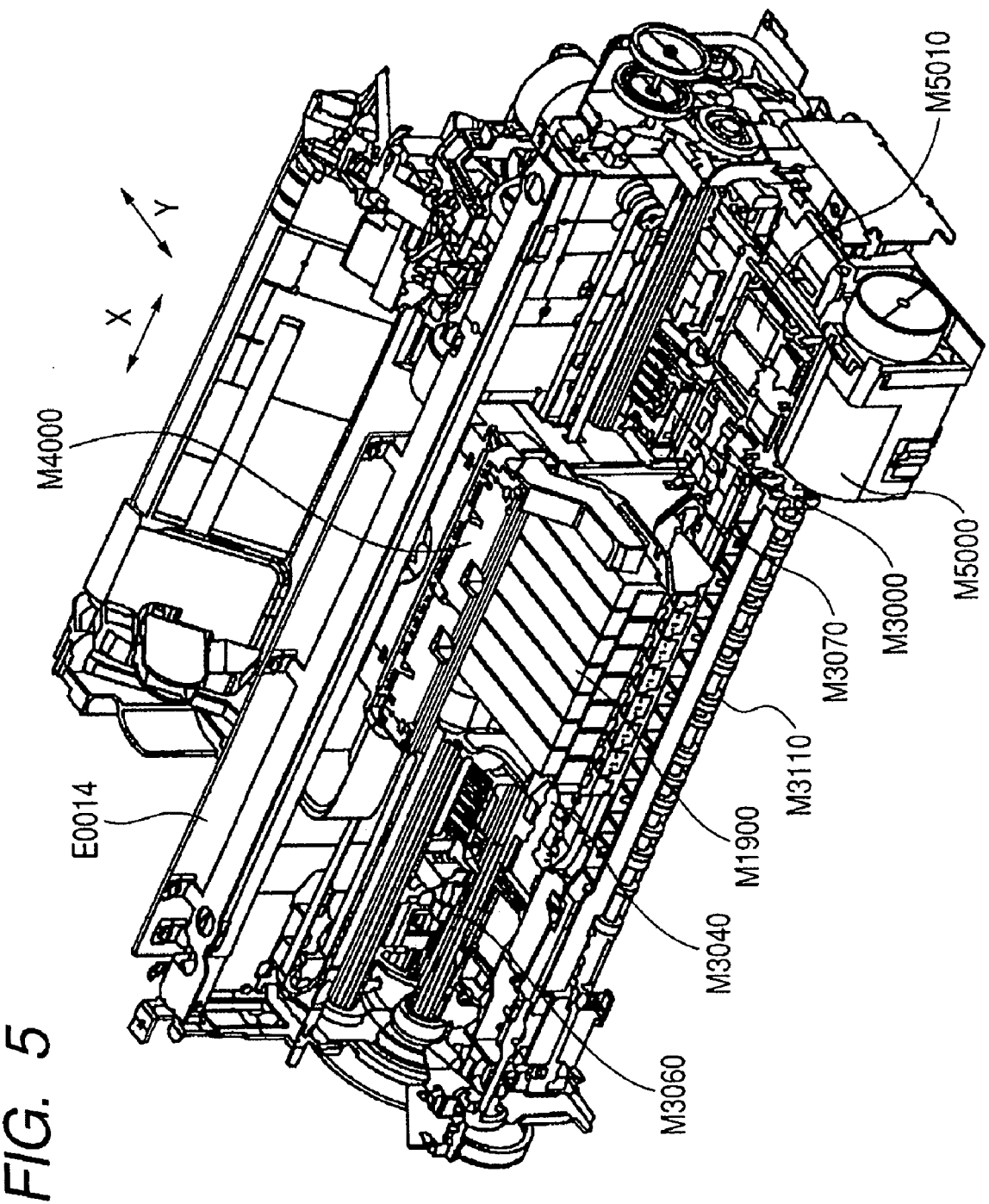
FIG. 5 is a perspective view of a mechanism portion of the recording apparatus.
Figure 6:
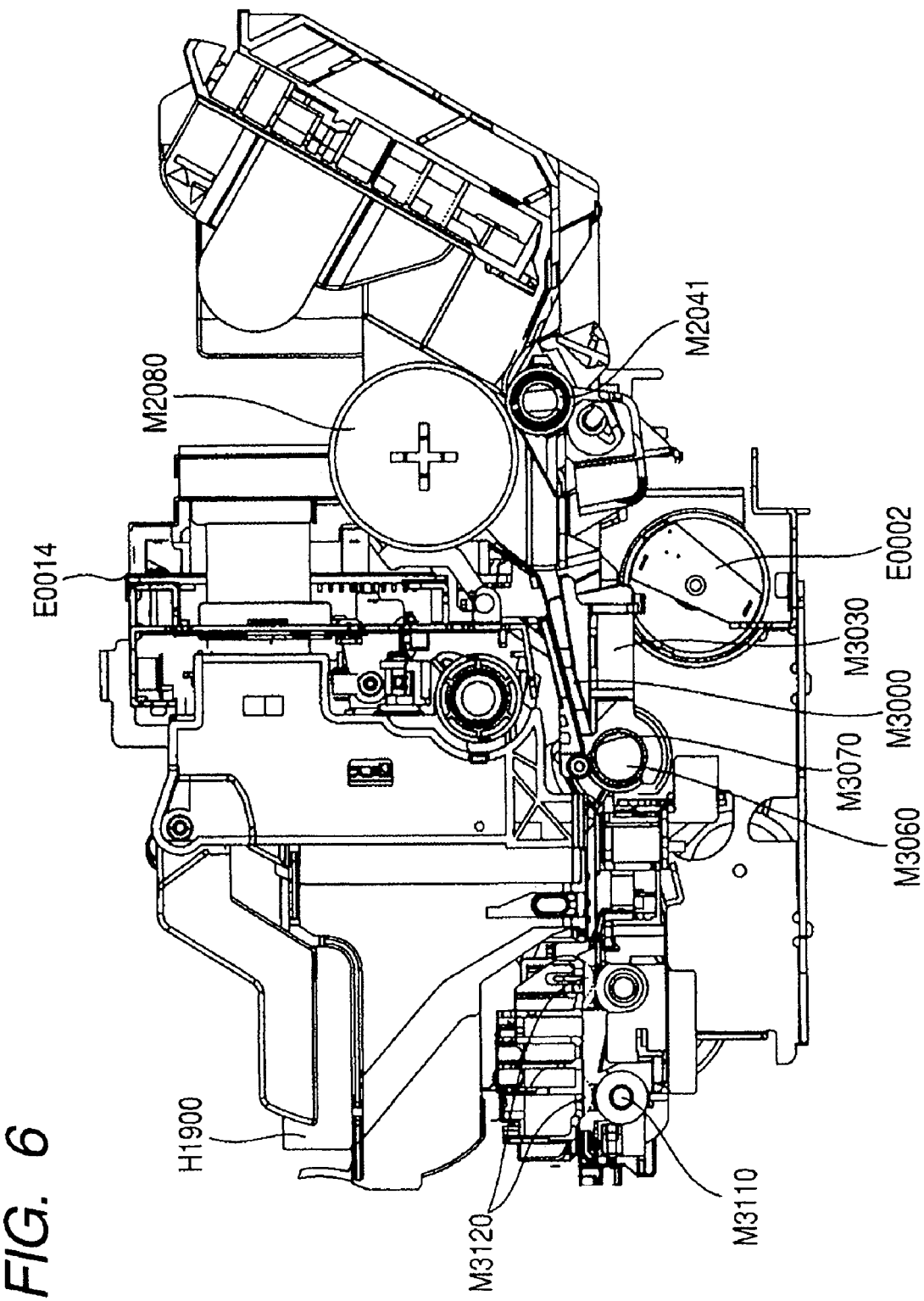
FIG. 6 is a sectional view of the recording apparatus.

FIG. 4 is a perspective view of a recording apparatus. FIGS. 5 and 6 are views for explaining the internal mechanism of a recording apparatus main body. FIG. 5 is a perspective view seen from an upper right portion, and FIG. 6 is a side sectional view of the recording apparatus main body.

When a sheet is to be fed in the recording apparatus, only a predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 7) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in a column direction and sub scanning in which a recording medium is conveyed in a row direction by the conveying roller M3060 are alternately repeated, whereby an image is formed on the recording medium.

Finally, the recording medium on which an image has been formed is sandwiched at a nip between a first sheet discharge roller M3110 and a spur M3120 in the sheet discharge portion, conveyed, and discharged to a sheet discharge tray M3160.

In the cleaning portion when a pump M5000 is allowed to act in a state where a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described. The head cartridge H1000 includes the recording head H1001, means for mounting ink tanks H1900, and means for supplying ink from the ink tanks H1900 to the recording head, and is detachably mounted on the carriage M4000.

Figure 7:
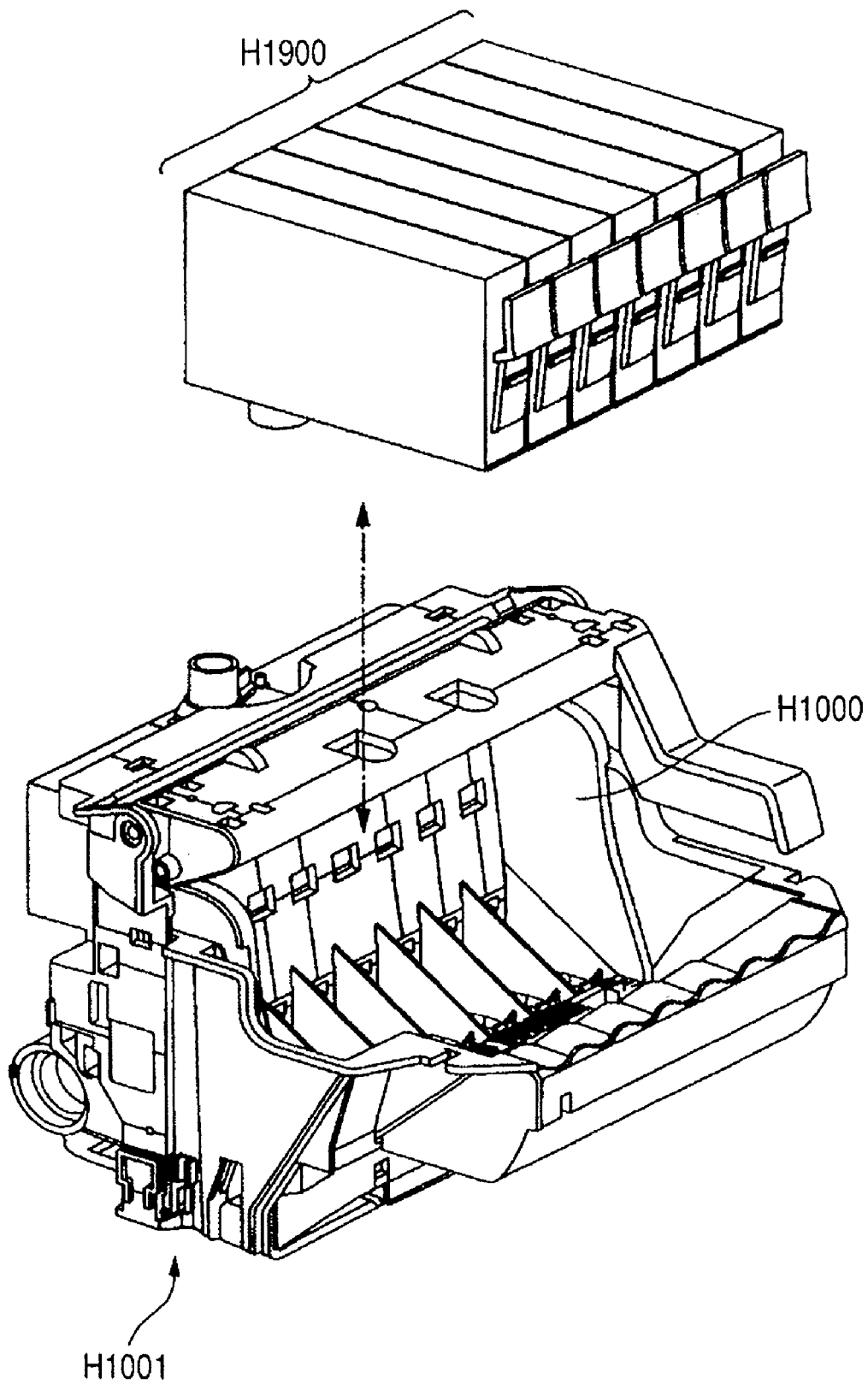
FIG. 7 is a perspective view showing a state in which an ink tank is mounted on a head cartridge.

FIG. 7 shows how the ink tanks H1900 are mounted on the head cartridge H1000 The recording apparatus forms an image by means of yellow, magenta, cyan black, pale magenta, pale cyan, and green inks, so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

Figure 8:
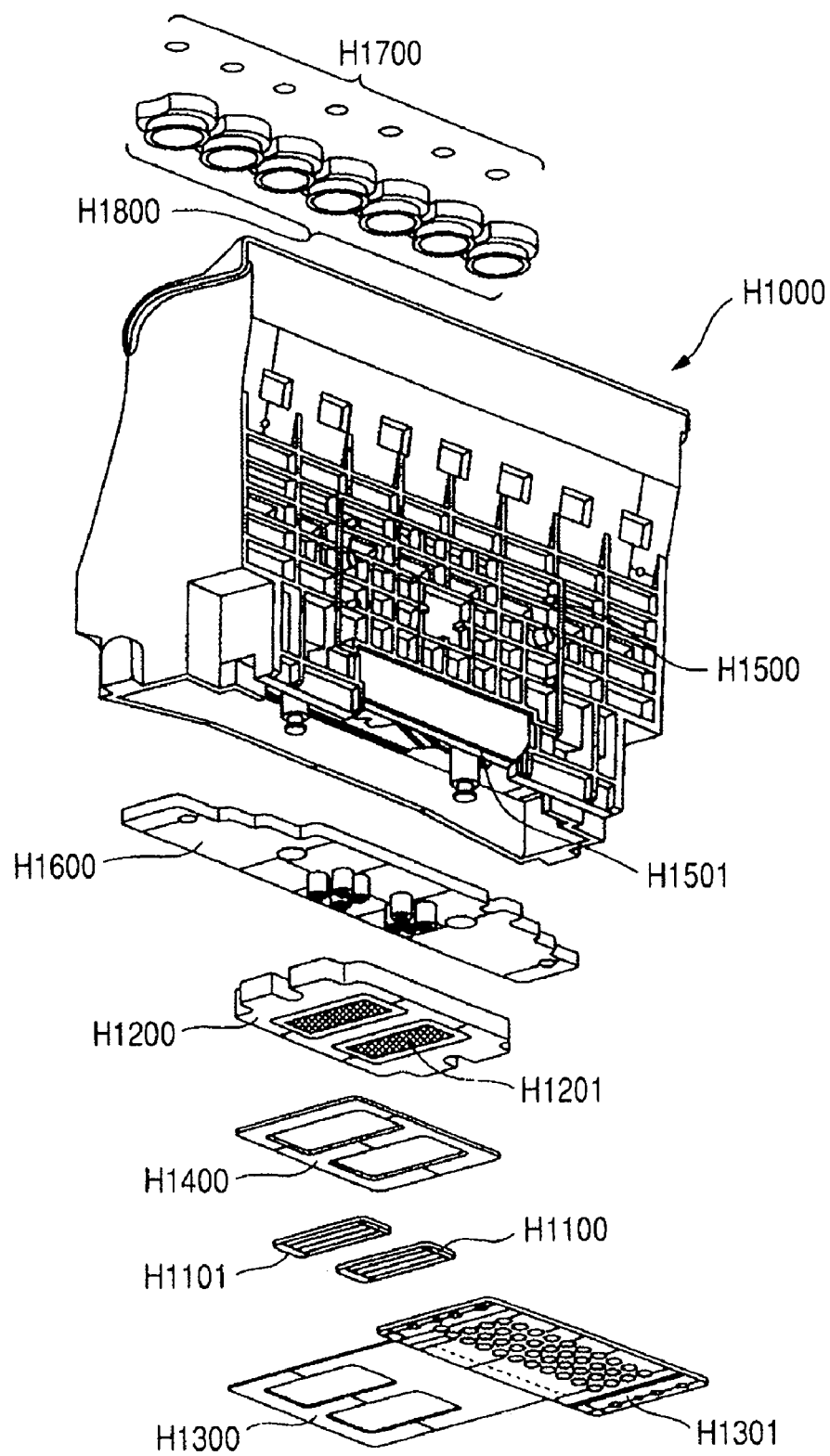
FIG. 8 is an exploded perspective view of the head cartridge.

FIG. 8 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is an Si substrate having multiple recording elements (nozzles) for ejecting ink formed on one surface by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 9:
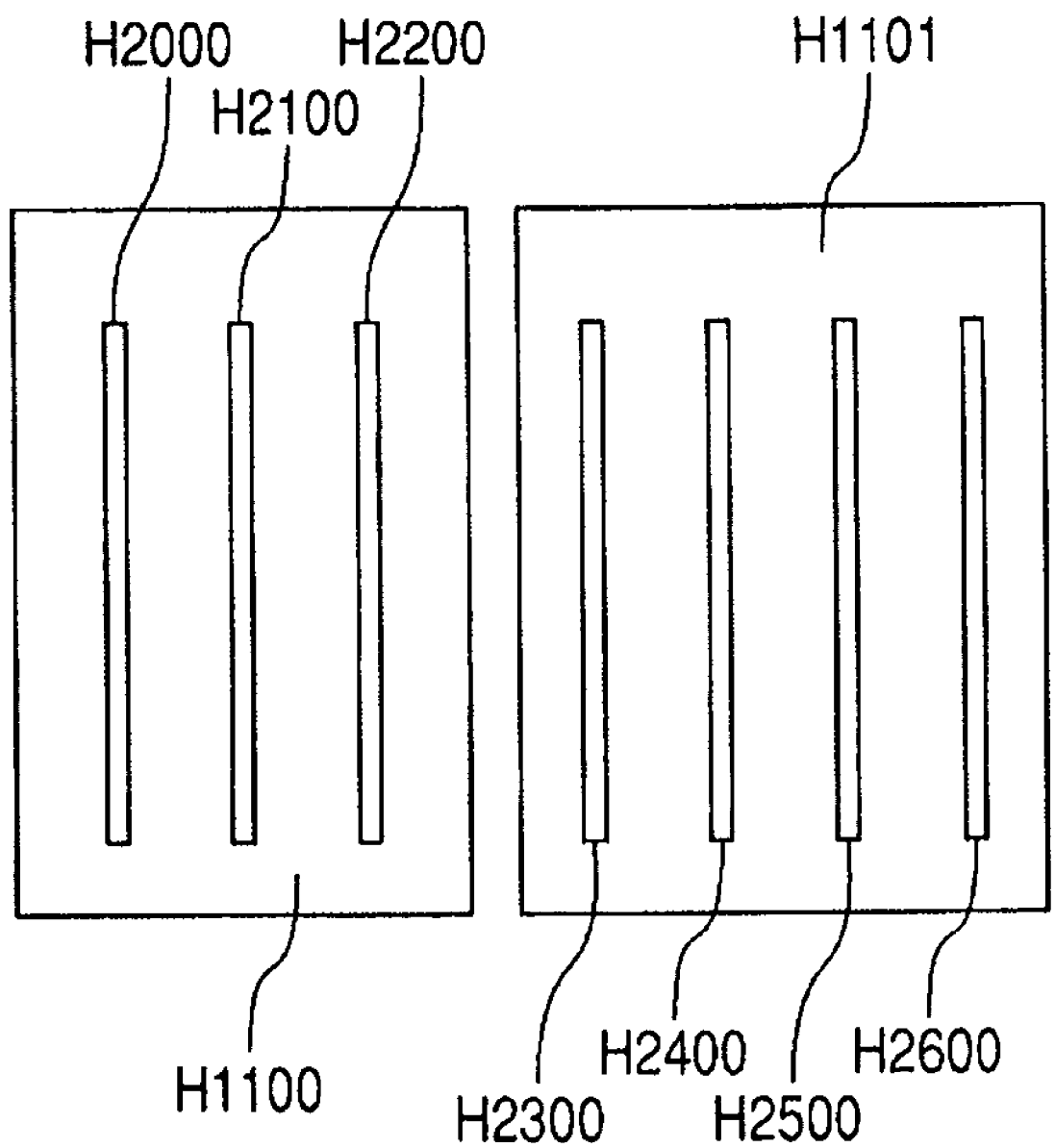
FIG. 9 is a front view showing a recording element substrate in the head cartridge.

FIG. 9 is an enlarged front view for explaining the constitution of each of the first recording element substrate H1100 and the second recording element substrate 1101. Reference symbols H2000 to H2600 denote recording element trains (which may hereinafter be also referred to as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at an interval of 1,200 dpi (dot/inch; reference value) in the conveying direction of a recording medium, and each nozzle ejects about 2 pl of ink. An opening area in each nozzle ejection port is set to about 100 $\mu m^2$. The first recording element substrate H1100 and the second recording element substrate H1101 are bonded and fixed to the first plate H1200 having formed thereon ink supply ports H1201 for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100 and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at an end portion on the ink tank side of the ink flow path H1501 engaged with the ink tanks H1900, so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is constituted by connecting through bonding or the like a tank holder portion constituted by the tank holder H1500, the flow path forming member H1600, the filter H1700, and the seal rubber H1800, and the recording head portion H1001 constituted by the first recording element substrate H1100, the second recording element substrate H1101, the first plate H1200, the electric wiring substrate H1300, and the second plate H1400.

Description has been made here by taking, as an example of an embodiment of a recording head, a recording head according to a bubble jet (registered trademark) method that performs recording by means of an electrothermal converter (recording element) for generating thermal energy for causing ink to generate film boiling in accordance with an electrical signal.

The representative structure and principle of a bubble jet method are preferably basic principles disclosed in, for example, descriptions of U.S. Pat. No. 4,723,129 and U.S. Pat. No. 4,740,796. The method is applicable to any one of so-called an on-demand type and a continuous type. In particular, the method is effective for the on-demand type because of the following reason. At least one driving signal which corresponds to recording information and causes a sudden increase in temperature exceeding nuclear boiling is applied to an electrothermal converter arranged in correspondence with a sheet or liquid flow path holding a liquid (ink), to thereby cause the electrothermal converter to generate thermal energy. Then, a thermal action surface of a recording head is caused to generate film boiling. As a result, an air bubble in the liquid (ink) can be formed so as to be in one-to-one correspondence with the driving signal. The growth and contraction of the air bubble cause the liquid (ink) to be ejected through an opening for ejection, thereby forming at least one droplet. The driving signal is more preferably of a pulse shape because the growth and contraction of an air bubble can be performed immediately and appropriately, and hence the liquid (ink) can be ejected with excellent responsiveness.

An example of a second embodiment of an ink jet recording apparatus utilizing mechanical energy includes an on-demand ink jet recording head including: a nozzle forming substrate having multiple nozzles; pressure generating means arranged so as to be opposed to the nozzles and composed of a piezoelectric material and a conductive material; and ink filling the surroundings of the pressure generating means, in which the pressure generating means is displaced by an applied voltage to eject a small ink droplet from a nozzle.

The ink jet recording apparatus is not limited to such apparatus as described above in which a head and an ink tank are separated, and may be one in which a head and an ink tank are integrated so that they are unseparable. The ink tank may be separably or unseparably integrated with the head to be mounted on a carriage, or may be mounted at a fixing portion of an apparatus to supply ink to a recording head through an ink supply member such as a tube. When the ink tank is provided with a constitution for applying a preferable negative pressure to the recording head, an absorber may be arranged in an ink storage portion of the ink tank, or the ink tank may have a flexible ink storage bag and a spring portion for applying bias to expand the internal volume of the bag. The recording apparatus may adopt a serial recording method as described above, or may be in the form of a line printer obtained by aligning recording elements over the range corresponding to the entire width of a recording medium.

EXAMPLES

Hereinafter, the present invention will be described in more detail by way of examples and comparative examples. However, the present invention is not limited to the following examples unless the examples depart from the gist of the present invention. Unless otherwise stated, the term "part"

of each ink component in examples and comparative examples represents "part by weight".

<Synthesis of Coloring Material>

(1) Synthesis of Tetrasodium Copper Phthalocyanine Tetrasulfonate (Compound (2))

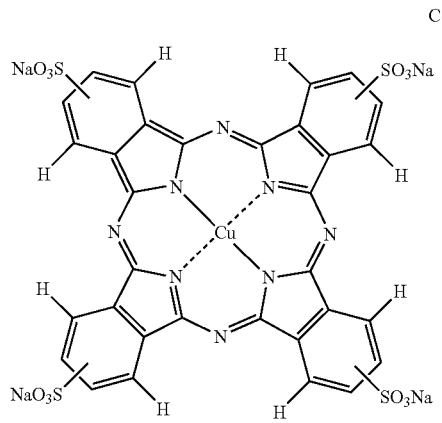

Compound (2)

Sulfolane, monosodium 4-sulfophthalate, ammonium chloride, urea, ammonium molybdate, and copper (II) chloride were mixed, stirred, and washed with methanol. After that, water was added to the resultant product, and an aqueous solution of sodium hydroxide was used to adjust the pH of the solution to 11. An aqueous solution of hydrochloric acid was added to the resultant solution under stirring, and then sodium chloride was gradually added to separate out crystals. The resultant crystals were filtered and washed with a 20% aqueous solution of sodium chloride, and then methanol was added. The separated out crystals were filtered out, washed with a 70% aqueous solution of methanol, and dried to yield tetrasodium copper phthalocyanine tetrasulfonate (Compound (2)) as blue crystals.

(2) Synthesis of Copper Phthalocyanine Tetrasulfonic Chloride (Compound (3))

Compound (3)

Tetrasodium copper phthalocyanine tetrasulfonate (Compound (2)) thus prepared was gradually added to chlorosulfonic acid, and then thionyl chloride was added dropwise to perform reaction. After that, the reaction solution was cooled, and the separated out crystals were filtered out to yield a wet cake of copper phthalocyanine tetrasulfonic chloride.

(3) Synthesis of Following Compound (4)

A compound (4) is a compound represented by the general formula (IV) in which Y represents an amino group and $R_1$ and $R_2$ each represent a sulfonic group substituted at 2 or 5 position.

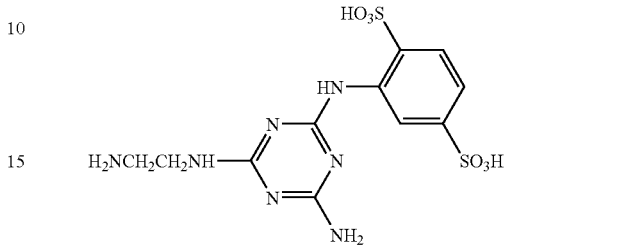

Compound (4)

Lipal OH, cyanuric chloride, and monosodium aniline-2,5-disulfonate were added in an ice water, and was allowed to react while anaqueous solution of sodium hydroxide was added. Next, an aqueous solution of sodium hydroxide was added to the reaction solution to adjust the pH of the reaction solution to 10. 28% ammonia water and ethylenediamine were added to the reaction solution to perform a reaction. Sodium chloride and concentrated hydrochloric acid were added to the resultant reaction solution to separate out crystals. The separated out crystals were filtered out and fractionated, and was washed with a 20% aqueous solution of sodium chloride to prepare a wet cake. Methanol and water were added to the resultant wet cake, and the whole was filtered, washed with methanol, and dried to yield the compound (4).

(4) Synthesis of Coloring Materials A to G.

The wet cake of copper phthalocyanine tetrasulfonic chloride (Compound (3)) synthesized in the above (2) was added to an ice water, and the whole was stirred to prepare a suspension. Ammonia water and the compound (4) synthesized in (3) were added to the suspension to perform a reaction. Water and sodium chloride were added to the mixture to separate out crystals. The resultant crystals were filtered, washed with an aqueous solution of sodium chloride, and filtered again, washed, and dried to yield a coloring material A as blue crystals. In view of the above reaction, the compound is estimated to be a coloring material which is a compound represented by Exemplified Compound 1 and has average numbers of substituents in the general formula (I) of l=0, m=1.0 to 2.0, and n=2.0 to 3.0.

Coloring materials B to G which were compounds each represented by Exemplified Compound 1 and were different from one another in average number of substituents in the general formula (I) were synthesized in the same synthesis procedure as described above. Table 5 below shows the average number of substituents in each of the coloring materials A to G.

TABLE 5

| Coloring material | l | m | n |
|---|---|---|---|
| A | 0 | 1.0–2.0 | 2.0–3.0 |
| B | 0–0.5 | 1.0–1.5 | 2.0–2.5 |
| C | 0.5–1.0 | 1.0–1.5 | 2.0–2.5 |
| D | 0 | 1.0–2.0 | 2.0–3.0 |
| E | 0.5–1.0 | 1.0–1.5 | 2.0–2.5 |

TABLE 5-continued

| Coloring material | l | m | n |
|---|---|---|---|
| F | 0 | 1.5–2.0 | 2.0–2.5 |
| G | 1.0–1.5 | 1.0–1.5 | 1.5–2.0 |

<Evaluation of Bronze Resistance>

(1) Preparation of Ink

The respective components shown in Table 6 below were mixed and sufficiently stirred. After that, the resultant product was filtered through a membrane filter having a pore size of 0.2 μm under pressure to prepare each of inks A to D.

TABLE 6

|  | Ink | | | |
|---|---|---|---|---|
|  | A | B | C | D |
| Coloring material A | 3.0 | | | |
| Coloring material B | | 3.0 | | |
| Coloring material C | | | 3.0 | |
| Coloring material D | | | | 3.0 |
| Glycerin | 20.0 | 20.0 | 20.0 | 20.0 |
| Acetylenol EH (*) | 1.0 | 1.0 | 1.0 | 1.0 |
| Ion-exchanged water | 76.0 | 76.0 | 76.0 | 76.0 |

(*) Ethylene oxide adduct of acetylene glycol (surfactant; manufactured by Kawaken Fine Chemicals Co., Ltd.)

(2) Measurement of $d_{75}$ Value

The scattering angle profile of each of the inks A to D (each having a coloring material concentration of 3.0 weight %) was measured by means of small-angle X-ray scattering method. The scatter angle profile was measured under the following conditions.

Apparatus: Nano Viewer (manufactured by Rigaku)
X-ray source: Cu-Kα
Output: 45 kV-60 mA
Effective focal spot: 0.3 mmΦ+Confocal Max-Flux Mirror
$1^{st}$ Slit: 0.5 mm, $2^{nd}$ Slit: 0.4 mm, $3^{rd}$ Slit: 0.8 mm
Irradiation time: 240 min
Beam stopper: 3.0 mmΦ
Measurement Method: Penetration Method
Detector: Blue Imaging Plate A peak area obtained by removing a background and a 2θ value accounting for 75% or more of the entire peak area ($2\theta_{75}$ value) were measured from the resultant scattering angle profile by means of an X-ray diffraction data processing soft JADE (Material Data, Inc.). The $d_{75}$ value was calculated from the $2\theta_{75}$ value on the basis of the following expression, (2). Table 7 shows the results $$d_{75}=\lambda/2 \sin \theta_{75} \quad \text{Eq. (2)}$$

(3) Measurement of Maximum Absorption Wavelength (λmax)

After each of the inks A to D (each having a coloring material concentration of 3.0 weight %) had been diluted 2,000 times with pure water, the maximum absorption wavelength (λmax) was measured. Table 7 shows the results. The maximum absorption wavelength (λmax) was measured under the following conditions.

Spectrophotometer: Self-recording spectrophotometer (trade name: U-3300; manufactured by Hitachi, Ltd.)
Measurement cell: 1 cm quartz cell
Sampling interval: 0.1 nm
Scanning rate: 30 nm/min
Number of measurements:,Measurement was performed five times to take the average value of the five measurements.

(4) Creation of Recorded Product

Each of the inks A to D thus prepared was mounted on an ink jet recording apparatus (trade name: Pixus 950i; manufactured by CANON Inc.) to print a 13-level gradation pattern on an ink jet glossy medium (trade name: PR101; manufactured by CANON Inc.) by changing a printing duty to 5, 12, 21, 29, 35, 43, 51, 58, 66; 74, 85, 90, and 100%. Thus, a recorded product was created.

(5) Evaluation of Bronze Resistance

The printing duty at which the bronze phenomenon occurred in the 13-level gradation pattern of the recorded product thus-created was visually observed to define the printing duty as the printing duty at which the bronze phenomenon occurred. In general, the bronze phenomenon is apt to occur with increasing printing duty. In other words, the bronze phenomenon is more likely.to occur where the ink has a lower printing duty at which the bronze phenomenon occurs, while the bronze phenomenon is less likely to occur where the ink has a higher printing duty at which the bronze phenomenon occurs. The criteria for the bronze resistance are as follows. Table 7 shows the results of the evaluation.

A: The printing duty at which the bronze phenomenon. occurs is: 90%. or more.
B: The printing duty at which the bronze phenomenon occurs is 66% or more and less than 90%.
C: The printing duty at which the bronze phenomenon occurs is 43% or more and less than 66%.
D: The printing duty at which the bronze phenomenon occurs is less than 43%.

TABLE 7

|  | Ink | $d_{75}$ value [nm] | Maximum absorption wavelength λ max[nm] | Bronze resistance |
|---|---|---|---|---|
| Example | A | 7.09 | 612.1 | B |
|  | B | 6.75 | 614.0 | A |
|  | C | 6.51 | 615.9 | A |
| Comparative Example | D | 7.11 | 611.9 | C |

<Evaluation of Bronze Resistance and Environmental Gas Resistance>

(1) Preparation of Ink

The respective components were mixed according to each of the formulations 1 to 4 shown in Table 8 below and sufficiently stirred. After that, the resultant product was filtered through a membrane filter having a pore size of 0.2 μm under pressure to prepare ink. The inks prepared by using the coloring material A according to the formulations 1 to 4 were denoted by A1 to A4, and the inks prepared by using the coloring material B according to the formulations 1 to 4 were denoted by B1 to B4 (the same holds true for the other inks). Thus, a total of 28 kinds of inks A1 to G4 were prepared.

TABLE 8

|  | Formulation 1 | Formulation 2 | Formulation 3 | Formulation 4 |
|---|---|---|---|---|
| Coloring material | 3.0 | 3.0 | 6.0 | 6.0 |
| Glycerin | 5.0 | 5.0 | 5.0 | 5.0 |

TABLE 8-continued

|  | Formulation 1 | Formulation 2 | Formulation 3 | Formulation 4 |
|---|---|---|---|---|
| Urea | 10.0 | 10.0 | 10.0 | 10.0 |
| 2-pyrrolidone | 2.5 |  | 2.5 |  |
| Ethylene glycol | 8.0 | 8.0 | 8.0 | 8.0 |
| Diethylene glycol |  | 2.5 |  | 2.5 |
| Acetylenol EH (*) | 0.8 | 0.8 | 0.8 | 0.8 |
| Ion-exchanged water | 70.7 | 70.7 | 67.7 | 67.7 |

(*) Ethylene oxide adduct of acetylene glycol (surfactant; manufactured by Kawaken Fine Chemicals Co., Ltd.)

(2) Measurement of $d_{75}$ Value

The scattering angle profile of each of the inks A1 to G4 was measured by means of a small-angle X-ray scattering method, provided that each of the inks prepared according to the formulations 3 and 4 was diluted 1.67 times with pure water before the scattering angle profile of the ink was measured by the means of small-angle X-ray scattering method. The scatter angle profile was measured under the following conditions.

Apparatus: Nano Viewer (manufactured by Rigaku)
X-ray source: Cu-Kα
Output: 45 kV-60 mA
Effective focal spot: 0.3 mmΦ+Confocal Max-Flux Mirror
$1^{st}$ Slit: 0.5 mm, $2^{nd}$ Slit: 0.4 mm, $3^{rd}$ Slit: 0.8 mm.
Irradiation time: 40 min
Beam stopper: 3.0 mmΦ
Measurement method: Penetration method
Detector: Blue Imaging Plate A peak area obtained by removing a background and a 2θ value accounting for 75% or more of the entire peak area ($2\theta_{75}$ value) were measured from the resultant scattering angle profile by means of an X-ray diffraction data processing soft JADE (Material Data, Inc.). The $d_{75}$ value was calculated from the $2\theta_{75}$ value on the basis of the following expression (2). Table 9 shows the results.

$$d_{75}=\lambda/2 \sin \theta_{75} \qquad \text{Eq. (2)}$$

(3) Measurement of Maximum Absorption Wavelength (λmax)

After each of the inks A1 to G4 (each having a coloring material concentration of 3.0 weight %) had been diluted 2,000 times with pure water, the maximum absorption wavelength (λmax) was measured. Table 9 shows the results. The maximum absorption wavelength (λmax) was measured under the following conditions.

Spectrophotometer: Self-Recording Spectrophotometer (Trade Name: U-3300; Manufactured by Hitachi, Ltd.)
Measurement cell: 1 cm quartz cell
Sampling interval: 0.1 nm
Scanning rate: 30 nm/min Number of measurements: Measurement was performed five times to take the average value of the five measurements.

(4) Creation of Recorded Product

Each of the inks A1 to G4 thus prepared was mounted on an ink jet recording apparatus (trade name: Pixus 950i; manufactured by CANON Inc.) to print a 13-level gradation pattern on an ink jet glossy medium (trade name: PR101; manufactured by. CANON Inc.) by changing a printing duty to 5, 12, 21, 29, 35, 43, 51, 58, 66, 74, 85, 90, and 100%. Thus, a recorded product was created.

(5) Evaluation of Bronze Resistance

The printing duty at which the bronze phenomenon occurred in the 13-level gradation pattern of the recorded product thus created was visually observed to define the printing duty as the printing duty at which the bronze phenomenon occurred. In general, the bronze phenomenon is apt to occur with increasing the printing duty. In other words, the bronze phenomenon is more likely to occur where the ink has a lower printing duty at which the bronze phenomenon occurs, while the bronze phenomenon is less likely to occur where the ink has a higher printing duty at which the bronze phenomenon occurs. The criteria for the bronze resistance are as follows. Table 9 shows the results of the evaluation.

A: The printing duty at which the bronze phenomenon occurs is 90% or more.
B: The printing duty at which the bronze phenomenon occurs is 66% or more and less than 90%.
C: The printing duty at which the bronze phenomenon occurs is 43% or more and less than 66%.
D: The printing duty at which the bronze phenomenon occurs is less than 43%.

(6) Evaluation of Environmental Gas Resistance

The recorded product thus created was placed in an ozone test apparatus (trade name: OMS-H; manufactured by SUGA TEST INSTRUMENTS) to perform ozone exposure in an environment having a temperature of 40° C., a humidity of 55%, and an ozone gas concentration of 2 ppm for 20 hours. A remaining density ratio was calculated on the basis of the following expression (3) from the reflection densities at a 50% duty portion of the recorded product before and after the exposure test. The reflection densities were measured by means of a Macbeth RD-918 (manufactured by Macbeth). The criteria for the environmental gas resistance are as follows. Table 9 shows the results of the evaluation.

$$\text{Remaining concentration ratio} = (d_{o3}/d_{ini}) \times 100(\%) \qquad \text{Eq. (3)}$$

(In the expression (3), $d_{o3}$ represents the reflection density after the ozone exposure and $d_{ini}$ represents the reflection density before the ozone exposure.)

A: A remaining concentration ratio of 88% or more.
B: A remaining concentration ratio of 83% or more and less than 88%.
C: A remaining concentration ratio of 80% or more and less than 83%.
D: A remaining concentratio ratio of less than 80%.

TABLE 9

|  | Ink | $d_{75}$ value [nm] | Maximum absorption wavelength λ max[nm] | Coloring material concentration[weight %] | Bronze resistance | Environmental gas resistance |
|---|---|---|---|---|---|---|
| Example | A1 | 7.03 | 612.2 | 3.0 | A | A |
|  | A2 | 7.07 | 612.0 | 3.0 | B | A |

TABLE 9-continued

|  | Ink | $d_{75}$ value [nm] | Maximum absorption wavelength $\lambda$ max[nm] | Coloring material concentration[weight %] | Bronze resistance | Environmental gas resistance |
|---|---|---|---|---|---|---|
|  | A3 | 7.02 | 612.2 | 6.0 | B | A |
|  | A4 | 7.08 | 612.0 | 6.0 | B | A |
|  | B1 | 6.71 | 614.0 | 3.0 | A | B |
|  | B2 | 6.78 | 614.3 | 3.0 | A | B |
|  | B3 | 6.72 | 614.1 | 6.0 | A | A |
|  | B4 | 6.79 | 614.4 | 6.0 | B | A |
|  | C1 | 6.51 | 615.7 | 3.0 | A | B |
|  | C2 | 6.57 | 615.9 | 3.0 | A | B |
|  | C3 | 6.52 | 615.6 | 6.0 | A | B |
|  | C4 | 6.56 | 615.9 | 6.0 | A | B |
| Comparative Example | D1 | 7.12 | 611.9 | 3.0 | C | A |
|  | D2 | 7.11 | 611.8 | 3.0 | C | A |
|  | D3 | 7.14 | 611.9 | 6.0 | C | A |
|  | D4 | 7.12 | 611.8 | 6.0 | C | A |
|  | E1 | 6.47 | 616.1 | 3.0 | A | C |
|  | E2 | 6.49 | 616.2 | 3.0 | A | C |
|  | E3 | 6.48 | 616.2 | 6.0 | A | C |
|  | E4 | 6.49 | 616.1 | 6.0 | A | C |
|  | F1 | 7.23 | 609.9 | 3.0 | C | A |
|  | F2 | 7.28 | 610.2 | 3.0 | D | A |
|  | F3 | 7.21 | 609.9 | 6.0 | D | A |
|  | F4 | 7.27 | 610.3 | 6.0 | D | A |
|  | G1 | 6.42 | 617.8 | 3.0 | A | D |
|  | G2 | 6.45 | 618.1 | 3.0 | A | D |
|  | G3 | 6.41 | 617.7 | 6.0 | A | C |
|  | G4 | 6.44 | 618.2 | 6.0 | A | C |

In accordance with the above results, the following was confirmed. In the case where the coloring material of the present invention which is a compound represented by the general formula (I) or a salt thereof is used, environmental gas resistance may not be sufficient when the $d_{75}$ value of ink is smaller than 6.50 nm, and bronze resistance may not be sufficient when the $d_{75}$ value is larger than 7.10 nm.

This application claims the priority from Japanese Patent Application. No. 2004-196453 filed on Jul. 2, 2004 and Japanese Patent Application No. 2005-192191 filed on Jun. 30, 2005, which are hereby incorporated by reference herein.

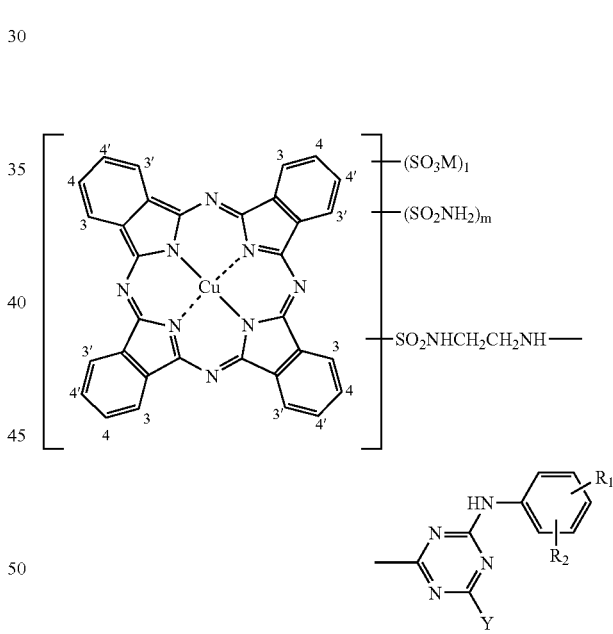

What is claimed is:

1. An ink jet ink comprising at least a coloring material, wherein:

the coloring material comprises one of a compound represented by the following general formula (I) or a salt thereof;

a content (weight %) of the coloring material is 3.0 weight % or more with respect to a total weight of the ink jet ink; and in a dispersion distance distribution, measured by a small-angle X-ray scattering method, of molecular aggregates in the ink jet ink whose coloring material concentration is adjusted to 3.0 weight %, a dispersion distance $d_{75}$ value corresponding to 75% of the distribution is 6.50 nm or more and 7.10 nm or less:

wherein M represents an alkali metal or ammonium; $R_1$ and $R_2$ each independently represent a hydrogen atom, a sulfonic group, or a carboxyl group provided (that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3 provided that l+m+n=3 to 4; and a substitution position of a substituent is one of 4 position and 4' position.

2. The ink jet ink according to claim 1, wherein the coloring material comprises one of a compound represented by the following general formula (II) or a salt thereof:

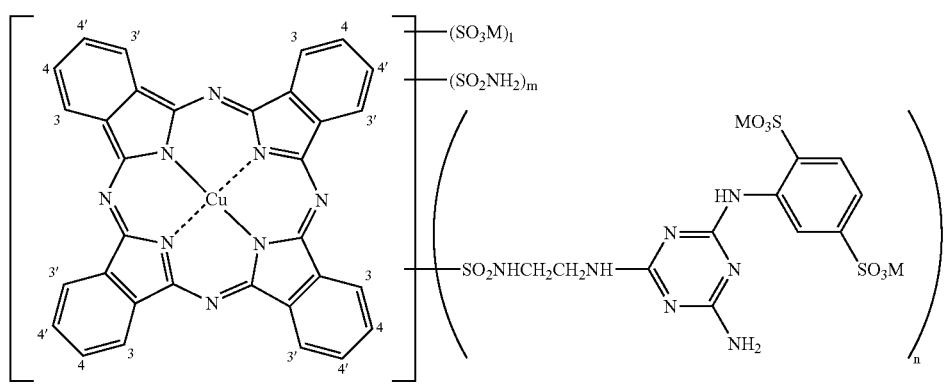

general formula (II)

wherein M represents an alkali metal or ammonium; l represents 0 to 2, m represents 1 to 3, and n represents 1 to 3 provided that l+m+n=3 to 4; and a substitution position of a substituent is one of 4 position and 4' position.

3. The ink jet ink according to claim 1, wherein the coloring material contains at least the compound in which $l \geqq 1$.

4. The ink jet ink according to claim 1, wherein the $d_{75}$ value is 6.70 nm or more.

5. An ink jet ink according to claim 1, further comprising: water and a water-soluble organic solvent, wherein:
the water-soluble organic solvent comprises 2-pyrrolidone; and
a content (weight %) of 2-pyrrolidone in the ink jet ink is 50% or more with respect to the content (weight %) of the coloring material.

6. An ink jet recording method, comprising ejecting an ink by an ink jet method to perform recording on a recording medium, wherein the ink comprises the ink jet ink according to claim 1.

7. An ink cartridge, comprising an ink storage portion for storing ink, wherein the ink comprises the ink jet ink according to claim 1.

8. A recording unit, comprising an ink storage portion for storing ink and a recording head for ejecting the ink, wherein the ink comprises the ink jet ink according to claim 1.

9. An ink jet recording apparatus, comprising an ink storage portion for storing ink and a recording head for ejecting the ink, wherein the ink comprises the ink jet ink according to claim 1.

10. An ink jet ink comprising at least a coloring material, wherein:
the coloring material comprises one of a compound represented by the following general formula (I) or a salt thereof;
a content (weight %) of the coloring material is 3.0 weight % or more with respect to a total weight of the ink jet ink; and
a maximum absorption wavelength (λmax) obtained by measuring an absorbance of an ink prepared by diluting 2,000 times the ink jet ink is 612.0 nm or more and 616.0 nm or less:

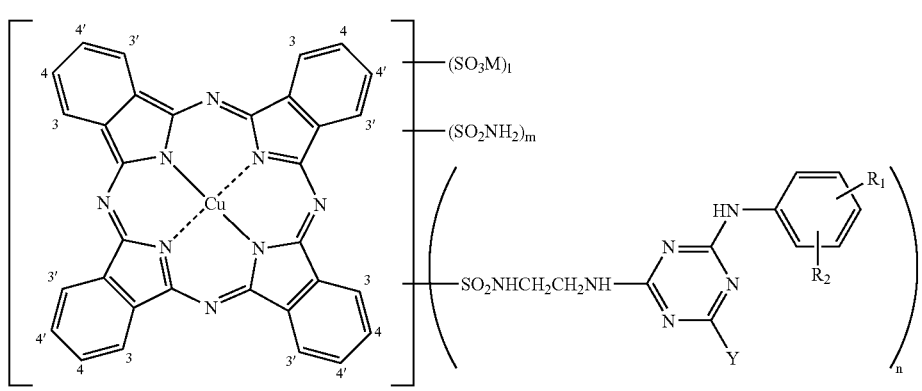

general formula (I)

wherein M represents an alkali metal or ammonium; $R_1$ and $R_2$ each independently represent a hydrogen atom, a sulfonic group, or a carboxyl group provided that $R_1$ and $R_2$ are not simultaneously a hydrogen atom; Y represents a chlorine atom, a hydroxyl group, an amino group, or a monoalkylamino or dialkylamino group; l represents 0 to 2, m represents 1 to 3, and n represents 1 to 3 provided that l+m+n=3 to 4; and a substitution position of a substituent is one of 4 position and 4' position.

11. The ink jet ink according to claim 10, wherein the coloring material comprises one of a compound represented by the following general formula (II) or a salt thereof:

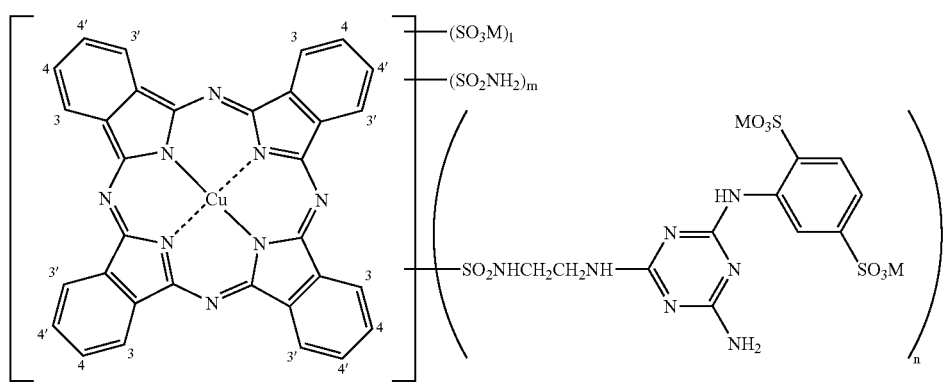

general formula (II)

wherein M represents an alkali metal or ammonium; l represents 0 to 2, m represents 1 to 3, and n represents 1 to 3 provided that l+m+n=3 to 4); and a substitution position of a substituent is one of 4 position and 4' position.

12. The ink jet ink according to claim 10, wherein the coloring material contains at least the compound in which $l \geqq 1$.

13. The ink jet ink according to claim 10, wherein the maximum absorption wavelength (λmax) is 612.0 nm or more and 614.0 nm or less.

14. An ink jet ink according to claim 10, further comprising water and a water-soluble organic solvent, wherein:
the water-soluble organic solvent comprises 2-pyrrolidone; and
a content (weight %) of 2-pyrrolidone in the ink jet ink is 50% or more with respect to the content (weight %) of the coloring material.

15. An ink jet recording method, comprising ejecting an ink by an ink jet method to perform recording on a recording medium, wherein the ink comprises the ink jet ink according to claim 10.

16. An ink cartridge, comprising an ink storage portion for storing ink, wherein the ink comprises the ink jet ink according to claim 10.

17. A recording unit, comprising an ink storage portion for storing ink and a recording head for ejecting the ink, wherein the ink comprises the ink jet ink according to claim 10.

18. An ink jet recording apparatus, comprising an ink storage portion for storing ink and a recording head for ejecting the ink, wherein the ink comprises the ink jet ink according to claim 10.

* * * * *

UNITED STATES PATENT AND TRADEMARK OFFICE
CERTIFICATE OF CORRECTION

PATENT NO. : 7,160,372 B2
APPLICATION NO. : 11/322116
DATED : January 9, 2007
INVENTOR(S) : Jun Yoshizawa et al.

It is certified that error appears in the above-identified patent and that said Letters Patent is hereby corrected as shown below:

COLUMN 1:
Line 55, "been." should read --been--.

COLUMN 3:
Line 38, "6.50.nm" should read --6.50 nm--.

COLUMN 5:
Line 51, "4position" should read --4 position--.

COLUMN 7:
Line 7, "too" should read --to--.
Line 63, "is" should read --a--.

COLUMN 11:
Line 37, "And" should read --and--.

COLUMN 17:
Line 4, "6.70." should read --6.70--.

COLUMN 18:
Line 6, "group" should read --groups--.
Line 23, "(1)." should read --(1)--.

COLUMN 19:
Line 35, "polyhydric." should read --polyhydric--.

COLUMN 21:
Line 13, "iodopropagii-based," should read --iodopropagil-based--.
Line 25, "oxide" should read --1oxide--.
Line 26, "acetic," should read --acetic--.
Line 33, "(S);" should read --(S)--.
Line 42, "nitrite;" should read --nitrite,--.

COLUMN 22:
Line 67, "use" should read --used--.

COLUMN 24:
Line 25, "portion" should read --portion,--.
Line 42, "H1000" should read --H1000.--.
Line 43, "cyan black" should read --cyan, black--.

UNITED STATES PATENT AND TRADEMARK OFFICE
CERTIFICATE OF CORRECTION

PATENT NO. : 7,160,372 B2
APPLICATION NO. : 11/322116
DATED : January 9, 2007
INVENTOR(S) : Jun Yoshizawa et al.

It is certified that error appears in the above-identified patent and that said Letters Patent is hereby corrected as shown below:

COLUMN 25:
Line 33, "H1100" should read --H1100,--.

COLUMN 28:
Line 22, "anaqueous" should read --an aqueous--.
Line 30, "was" should read --were--.

COLUMN 29:
Line 51, "expression, (2)." should read --expression (2).--; and "results" should read --results.--.
Line 60, "results.," should read --results.--.

COLUMN 30:
Line 1, "measurements:," should read --measurements:--.
Line 10, "66;" should read --66,--.
Line 15, "thus-created" should read --thus created--.
Line 19, "likely.to" should read --likely to--.
Line 26, "phenomenon." should read --phenomenon--.
Line 27, "is:" should read --is--.
Line 63, "ation 4" should read --lation 4--.

COLUMN 31:
Line 4, "ation" should read --lation 4--.
Line 53, "Spectrophotometer" should read --spectrophotometer--.

COLUMN 32:
Line 9, "by." should read --by--.
Line 57, "concentratio" should read --concentration--.

COLUMN 34:
Line 31, --general formula (I)-- should be inserted.
Line 56, "provided (that" should read --provided that--.

COLUMN 35:
Line 30, "2-pyffoli" should read --2-pyrroli--.

UNITED STATES PATENT AND TRADEMARK OFFICE
CERTIFICATE OF CORRECTION

PATENT NO. : 7,160,372 B2
APPLICATION NO. : 11/322116
DATED : January 9, 2007
INVENTOR(S) : Jun Yoshizawa et al.

It is certified that error appears in the above-identified patent and that said Letters Patent is hereby corrected as shown below:

<u>COLUMN 37</u>:
Line 22, "4);" should read --4;--.
Line 32, "2-pyffoli" should read --2-pyrroli--.

Signed and Sealed this

Seventh Day of August, 2007

JON W. DUDAS
*Director of the United States Patent and Trademark Office*